(12) United States Patent
Ahmed

(10) Patent No.: US 10,034,578 B2
(45) Date of Patent: Jul. 31, 2018

(54) HIGH PERFORMANCE ELECTRIC GRILL, METHOD, AND HEAT RADIATING MODULE

(71) Applicant: W.C. BRADLEY CO., Columbus, GA (US)

(72) Inventor: Mallik Ahmed, Columbus, GA (US)

(73) Assignee: W.C. BRADLEY CO., Columbus, GA (US)

( * ) Notice: Subject to any disclaimer, the term of this patent is extended or adjusted under 35 U.S.C. 154(b) by 373 days.

(21) Appl. No.: 14/823,408

(22) Filed: Aug. 11, 2015

(65) Prior Publication Data

US 2016/0051089 A1    Feb. 25, 2016

Related U.S. Application Data

(60) Provisional application No. 62/040,016, filed on Aug. 21, 2014.

(51) Int. Cl.
| | |
|---|---|
| *A47J 37/07* | (2006.01) |
| *F24C 7/10* | (2006.01) |
| *F24C 7/08* | (2006.01) |
| *A47J 37/06* | (2006.01) |
| *H05B 3/26* | (2006.01) |

(52) U.S. Cl.
CPC ....... *A47J 37/0709* (2013.01); *A47J 37/0629* (2013.01); *F24C 7/087* (2013.01); *F24C 7/10* (2013.01); *H05B 3/262* (2013.01); *H05B 2203/014* (2013.01); *H05B 2203/032* (2013.01)

(58) Field of Classification Search
CPC .... A47J 37/0709; A47J 37/0629; F24C 7/087
USPC ...................................................... 126/25 R
See application file for complete search history.

(56) References Cited

U.S. PATENT DOCUMENTS

| | | |
|---|---|---|
| 3,490,359 A | 1/1970 | Seitz |
| 3,623,422 A | 11/1971 | Marshall |
| 3,805,688 A | 4/1974 | Gvozdjak |
| 3,946,651 A | 3/1976 | Garcia |
| 4,403,597 A | 9/1983 | Miller |
| 4,702,746 A | 11/1987 | Hitch |
| 4,862,795 A | 9/1989 | Hawkins |

(Continued)

FOREIGN PATENT DOCUMENTS

EP    1 776 028 B1    10/2008

OTHER PUBLICATIONS

PCT/US2010/044380, "International Search Report and Written Opinion"; dated Sep. 27, 2010.

(Continued)

*Primary Examiner* — Jorge Pereiro
(74) *Attorney, Agent, or Firm* — Dennis D. Brown; Brown Patent Law, P.L.L.C.

(57) ABSTRACT

An electric grill and method, and an electrically-powered heat radiating module which is removably or permanently positioned in the grill housing. The heat radiating module includes one or more electric heating elements which are preferably contained within a shallow heating cavity which is at least 95% closed to air flow into or out of the heating cavity and is also preferably insulated. Fat and water drippings from the food product flow around the heat radiating module rather than into the heating cavity. An infrared cooking grate assembly with a food support grate positionable on an emitter plate is also provided.

38 Claims, 15 Drawing Sheets

(56) References Cited

U.S. PATENT DOCUMENTS

| | | |
|---|---|---|
| 5,197,379 A | 3/1993 | Leonard, Jr. |
| 5,276,307 A | 1/1994 | Higgins |
| 5,277,106 A | 1/1994 | Raymer et al. |
| 5,355,780 A | 10/1994 | Campbell |
| 5,355,868 A | 10/1994 | Haen |
| 5,467,691 A | 11/1995 | Koziol |
| 5,488,897 A * | 2/1996 | Snyder .................. A47J 37/067 99/425 |
| 5,546,851 A | 8/1996 | Goto |
| 5,582,094 A | 12/1996 | Peterson et al. |
| 5,603,256 A | 2/1997 | Charlson et al. |
| 5,719,377 A | 2/1998 | Giebel et al. |
| 5,735,260 A | 4/1998 | Rimback |
| 5,845,562 A * | 12/1998 | Deni .................... A47J 37/0611 219/386 |
| 5,911,812 A | 6/1999 | Stanek et al. |
| 5,974,954 A | 11/1999 | Rigney et al. |
| 6,104,004 A | 8/2000 | Ragland et al. |
| 6,114,666 A | 9/2000 | Best |
| 6,314,870 B1 | 11/2001 | Staller et al. |
| 6,520,174 B1 | 2/2003 | Scgliuolo |
| 7,066,169 B2 | 6/2006 | Feldwerth et al. |
| 7,277,326 B2 | 4/2007 | McKenzie et al. |
| 8,399,810 B2 | 3/2013 | Ahmed |
| 8,584,580 B2 | 11/2013 | Barrett |
| 8,602,018 B2 | 12/2013 | Johnston |
| 8,770,181 B2 | 7/2014 | Best |
| 2002/0189604 A1 | 12/2002 | McKenzie |
| 2006/0003279 A1 | 1/2006 | Best |
| 2006/0021517 A1 | 2/2006 | Best |
| 2007/0125357 A1 | 6/2007 | Johnston |
| 2007/0295223 A1 | 12/2007 | Reischmann et al. |
| 2008/0072890 A1 | 3/2008 | Best |
| 2008/0121117 A1 | 5/2008 | Best |
| 2009/0202688 A1 | 8/2009 | Best |
| 2009/0308374 A1 | 12/2009 | Ahmed |
| 2010/0095951 A1* | 4/2010 | Ahmed ............... A47J 37/0682 126/39 D |
| 2011/0186561 A1* | 8/2011 | Ahmed ............... A47J 37/0709 219/438 |
| 2012/0318149 A1* | 12/2012 | Ahmed ............... A47J 37/0682 99/445 |
| 2014/0144333 A1 | 5/2014 | Ahmed |

OTHER PUBLICATIONS

PCT/US2015/044647, "International Search Report and Written Opinion"; dated Oct. 28, 2015.

* cited by examiner

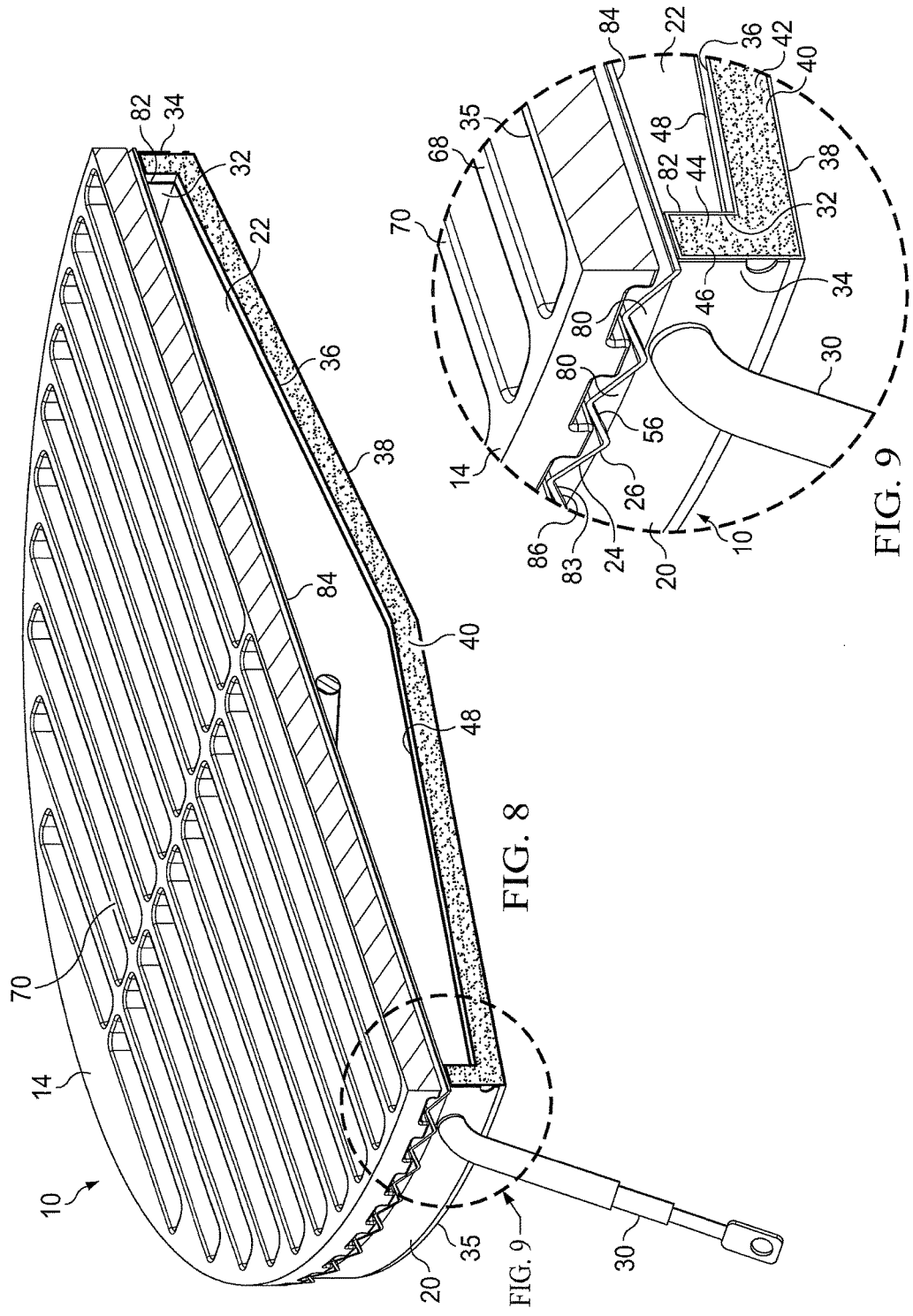

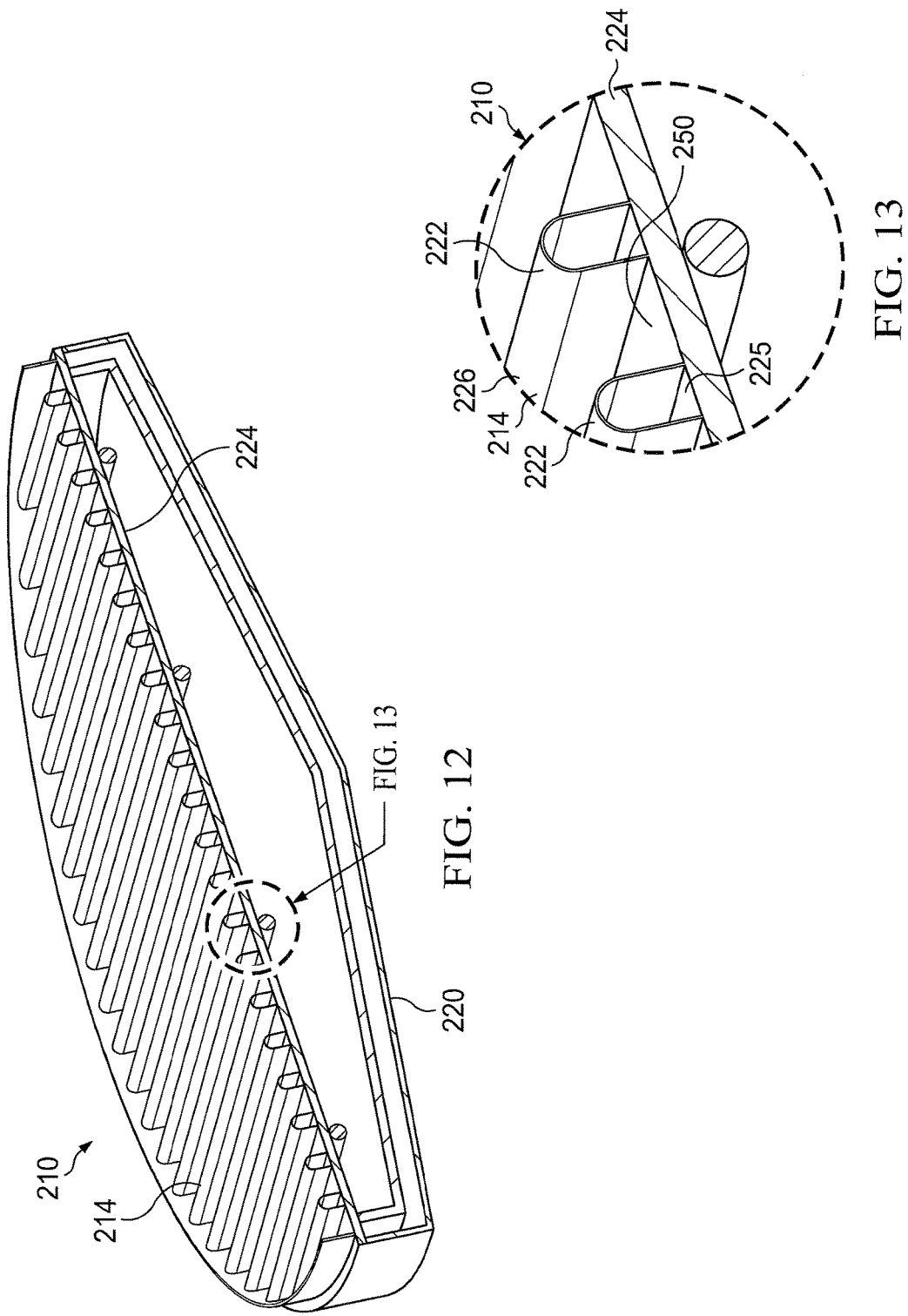

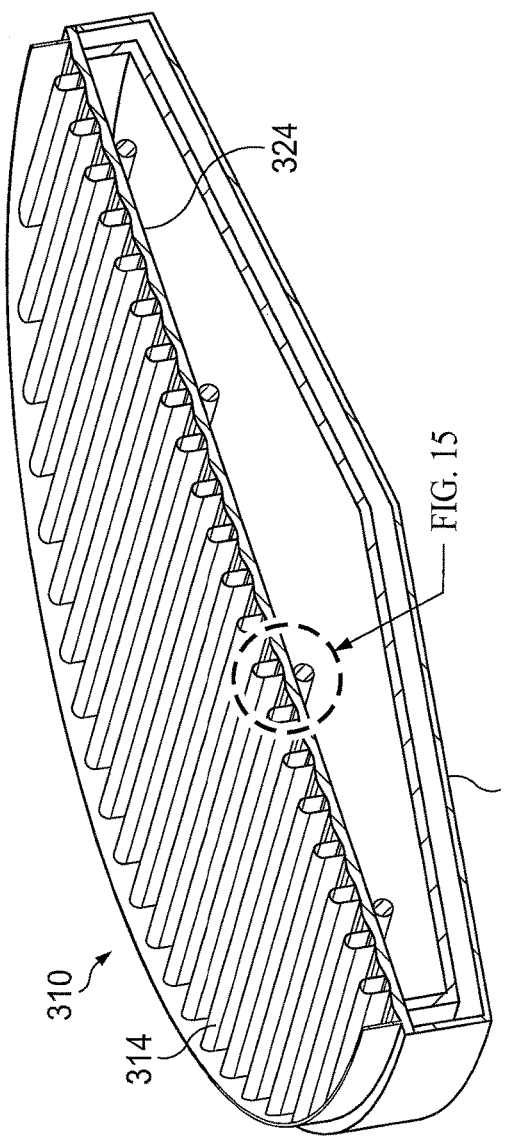
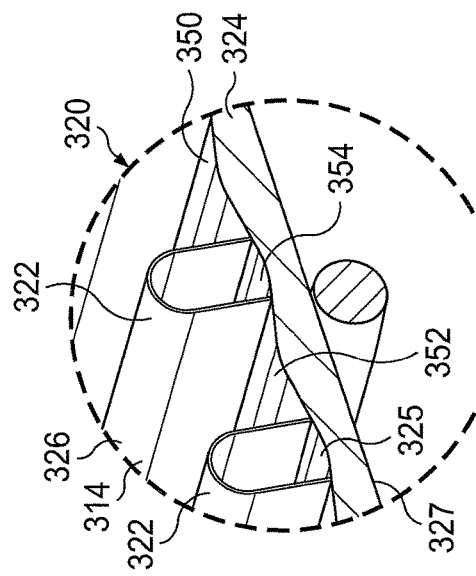
FIG. 14
FIG. 15

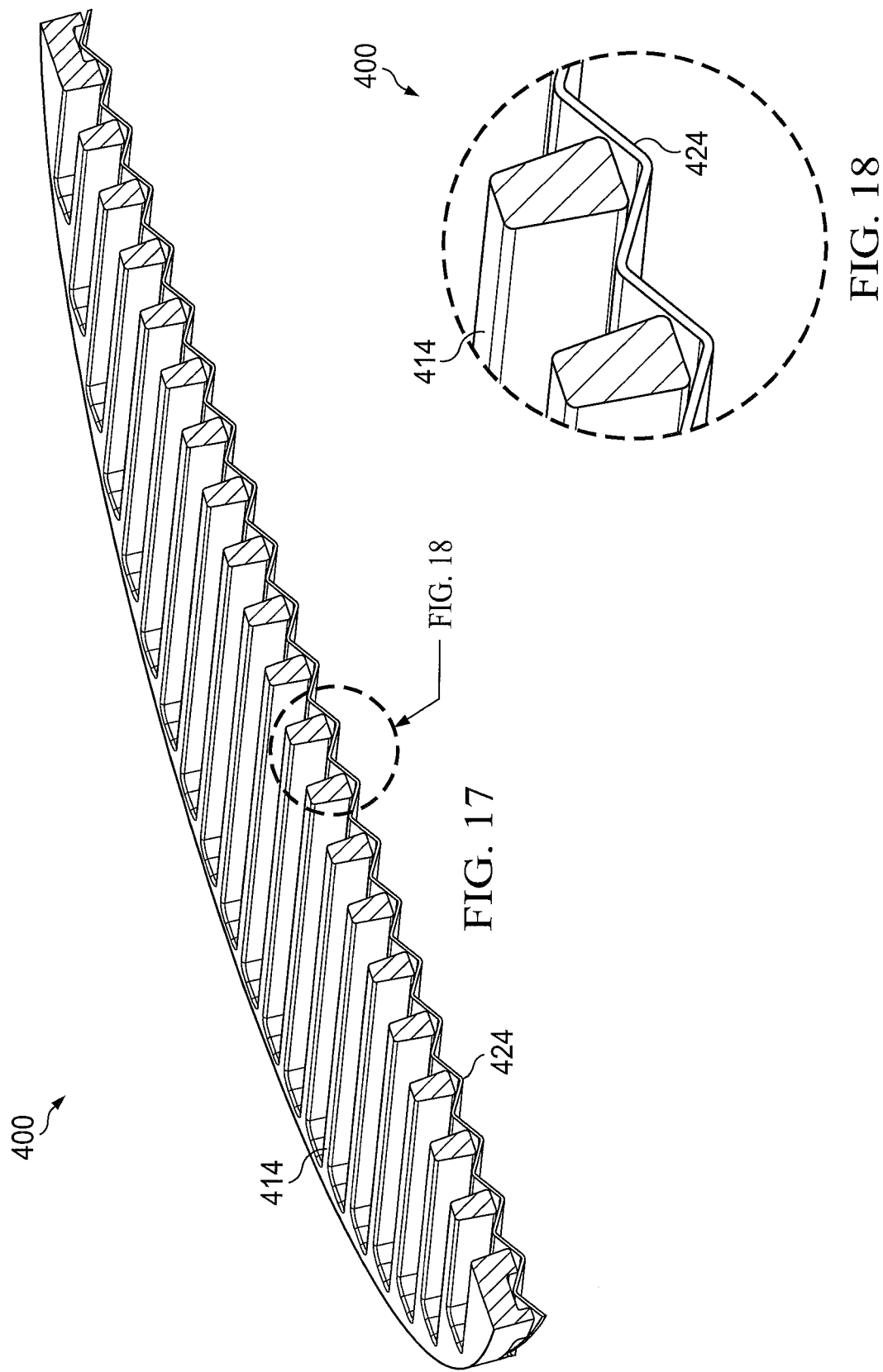

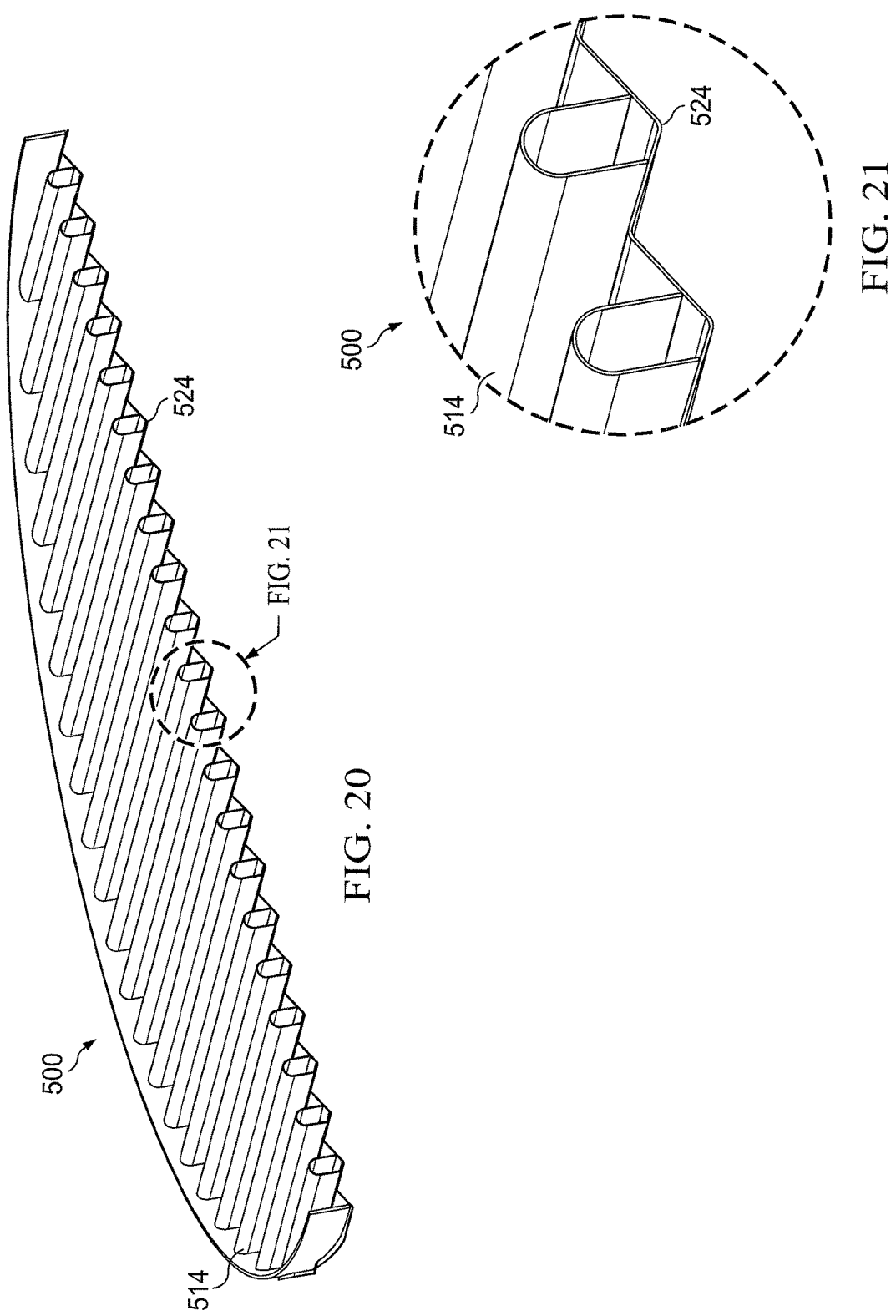

US 10,034,578 B2

HIGH PERFORMANCE ELECTRIC GRILL, METHOD, AND HEAT RADIATING MODULE

RELATED CASE

This application claims the benefit of U.S. Provisional Patent Application Ser. No. 62/040,016 filed on Aug. 21, 2014 and incorporates the provisional application by reference into this document as if fully set out at this point.

FIELD OF THE INVENTION

The present invention relates to electric grilling apparatuses and methods, and to an electric module for radiating heat energy for cooking food in an outdoor grill. The present invention also relates to infrared cooking grate assemblies.

BACKGROUND OF THE INVENTION

For many years, since the development of outdoor grilling appliances in the nineteen forties and fifties, there has been a desire for an effective electrically powered outdoor cooking appliance. It has long been believed that such a device might be made more convenient and easier to use, e.g., without requiring a special fuel like charcoal or propane. In recent years, the growing availability of electrical energy from renewable or otherwise environmentally friendly resources has added further impetus for the use of such electrical appliances.

The current electrical outdoor grilling appliance art includes various types of products. In a first type, an electrical resistance heating element is embedded in a cooking grate. As the current heats the electrical element, the electrical element transfers heat by conduction to the grate, which is usually made of a conductive material such as aluminum. The grate, in turn, heats the food by conduction. Typically, open slots are provided in the grate for draining grease. By alternating the contact areas and the open slots of the grate, the grill can produce, under favorable circumstances, a pattern of "sear" marks, which are desirable when grilling.

However, this first type of electric grill suffers from the problem that the temperature of the heated cooking surface must be held below the ignition point of the grease so that fire will not occur at the point of cooking. However, the required low temperature will not sufficiently vaporize the grease to produce the smoke necessary for flavoring the meat when grilling. Furthermore, the required low temperature allows accumulated grease to gather on the surface of the cooking grate around the food, despite the provision of grease drainage features.

In a second type of electric grill, a radiant heating element is suspended below an open wire-type cooking grate and is surrounded by an insulating material. Food is cooked by radiant heat through the open grate and by some conduction from the cooking grate, which is heated by the radiant element. The conductive heat from the grate can produce, under favorable circumstances, a pattern of "sear" marks desired for grilling. This type of grill is generally described in U.S. Pat. No. 6,104,004.

Unfortunately, in this second type of electric grill, good cooking performance can only be achieved by cooking with the lid closed as much as possible. The design and cooking performance of the grill depend upon the establishment of a large radiant cavity below and above the cooking grate. If the lid is open, the cavity is not only split into two open halves, but most of the radiant energy generated by the heating element is lost to the atmosphere with little effective retention by the food or by the open wire cooking grate.

In a third type of electric grill, a radiant element is used to heat a specific type of grate. The grate (a) restricts convective heat, (b) delivers predominately infrared heat to the food supported on it, and (b) uses conductive heat to create a pattern of sear marks on the food. In this configuration, a single or double conical heat shield is placed below the heating element to minimize heat loss. This type of grill is generally described in U.S. Pat. No. 8,399,810.

However, this third type of grill, though presenting better performance, takes a long time to warm up to a sufficient operating temperature for prompt searing. In addition, in grills of both the second type and the third type described above, a significant amount of free convective flow continuously occurs past the radiant heating element, thus having the effect of cooling the radiant element.

In addition, each of the prior art electric grills described above also suffers from a lack of power density. This condition is driven by the wattage limitations of standard US residential electrical systems. A standard 120 volt current, as limited by a 15 amp circuit breaker, provides an absolute upper power limit of only 1800 watts.

This power limit produces a thermal energy equivalent of just 6,147 BTU/hr for an entire cooking surface. Consequently, in the case of a 200 square inch cooking surface, the maximum power density available is only 30.7 BTU/hr/in$^2$. This power density is much lower than the 100 BTU/hr/in$^2$ maximum provided by a typical gas grill and is also much lower than the 60 to 80 BTU/hr/in$^2$ maximum provided by some newer gas infrared cooking systems. As a result, in less than ideal conditions, such as a cold windy day, the electrical cooking appliance may not produce adequate cooking results.

SUMMARY OF THE INVENTION

The present invention provides (a) an electric grill, (b) a grilling method, (c) a removable, or built-in, electrically-powered heat radiating module for a grill, and (d) an infrared cooking grate assembly which satisfy the needs and alleviate the problems discussed above. The inventive electric grill, method and heat radiating module: (a) provide much higher efficiency, a much greater cooking heat flux, and a much greater high cooking temperature than are provided by the prior art electric grills; (b) provide more than 70% infrared cooking energy; (c) provide much higher cooking grate surface temperatures for producing sear marks, even when cooking with the lid open; (d) reduce warm-up times to an extent that an average grate temperature of 450° or more can be achieved in just 15 minutes; and (e) provide these higher cooking and searing temperatures and heat fluxes while at the same reducing flare-ups and significantly increasing the production of beneficial smoke for flavoring. In addition, the electrically-powered heat radiating module is a separately serviceable part in which the electric heating element is isolated or substantially isolated from contact with drippings containing fat, water, and food particles which are produced in the cooking process.

In one aspect, there is provided a module for radiating heat energy for cooking food comprising: a module housing having a heating cavity therein, the heating cavity having a bottom wall; an emitter plate on or in an upper end portion of the module housing, the emitter plate having an upper emitting surface; and at least one electric heating element positioned in the heating cavity beneath the emitter plate. The emitter plate substantially covers and substantially closes an upper end of the heating cavity such that the upper end of said heating cavity is at least 95% closed to air flow out of or into the upper end of the heating cavity. In addition, the emitter plate and the module housing are at least 95% closed to flow from the upper emitting surface of the emitter plate into the heating cavity of fat and water which fall onto the upper emitting surface from the food. Further, it is also preferred that the upper emitting surface of the emitter plate comprise an alternating series of ridges and valleys.

In another aspect, there is provided an apparatus for grilling a food product comprising: a grill base housing having an interior cavity with an interior bottom; a lid for opening and closing the grill base housing; a module for radiating heat energy, the module being positioned at least partially within the interior cavity of the grill base housing above the interior bottom wall of the grill base housing and the module comprising an emitter plate having an upper emitting surface; and a food support grate which is positionable on the emitter plate, the food support grate having a food support surface which is spaced above the upper emitting surface of the emitter plate. In addition, the module comprises a module housing having a heating cavity therein, the heating cavity having a bottom wall and the emitter plate being positioned on or in an upper end portion of the module housing. The module also comprises at least one electric heating element positioned in the heating cavity beneath the emitter plate. The emitter plate substantially covers and substantially closes an upper end of the heating cavity such that the upper end of the heating cavity is at least 95% closed to air flow out of or into the upper end of the heating cavity. Further, the emitter plate and the module housing are at least 95% closed to flow from the upper emitting surface of the emitter plate into the heating cavity of fat and water which fall onto the upper emitting surface from the food product.

In another aspect, there is provided an outdoor cooking grill comprising: a grill base housing having an interior cavity with an interior bottom; a lid for opening and closing the grill base housing; an interior housing at least partially within the interior cavity of the grill base housing above the interior bottom of the interior cavity, the interior housing having a heating cavity therein with a heating cavity bottom wall; an emitter plate positioned on or in an upper end portion of the interior housing, the emitter plate having an upper emitting surface; a food support grate which is positionable on the emitter plate, the food support grate having a food support surface which is spaced above the upper emitting surface of the emitter plate; and at least one electric heating element positioned in the heating cavity beneath the emitter plate. The emitter plate substantially covers and substantially closes an upper end of the heating cavity such that the upper end of the heating cavity is at least 95% closed to air flow out of or into the upper end of the heating cavity. In addition, the emitter plate and the interior housing are at least 95% closed to flow from the upper emitting surface of the emitter plate into the heating cavity of fat and water which fall onto the upper emitting surface from the food product.

In yet another aspect, there is provided an infrared cooking grate assembly comprising any one of the various types of emitter plates described herein and any one of the various types of food support grates described herein, wherein the food support grate is removably positionable on the emitter plate. The inventive infrared cooking grate assembly provides a high percentage of infrared cooking energy, is highly flame-up resistant, and can generally be used on any regular type of electric, gas, charcoal, or other cooking grill.

Further aspects, features, and advantages of the present invention will be apparent to those of ordinary skill in the art upon examining the accompanying drawings and upon reading the following detailed description of the preferred embodiments.

BRIEF DESCRIPTION OF THE DRAWINGS

FIG. 8 is a rotated cutaway perspective view of the inventive heating module 10 having the food support grate 14 positioned thereon;

FIG. 9 is an enlarged view of the section 35, identified in FIG. 8, of the inventive heat radiating module 10;

FIG. 12 is a cutaway perspective view of an alternative embodiment 210 of the inventive electrically powered module for radiating heat energy comprising a flat emitter plate 224.

FIG. 13 is an enlarged view of the Detail A, identified in FIG. 12, of the inventive heat radiating module 210.

FIG. 14 is a cutaway perspective view of an alternative embodiment 310 of the inventive electrically powered module for radiating heat energy comprising an emitter plate 324 with a flat bottom.

FIG. 15 is an enlarged view of the Detail B, identified in FIG. 14, of the inventive heat radiating module 310.

FIG. 17 is a cutaway perspective view of the inventive infrared cooking grate assembly 400.

FIG. 18 is an enlarged view of the Detail C, identified in FIG. 17, of the inventive cooking grate assembly 400.

FIG. 20 is a cutaway perspective view of the inventive infrared cooking grate assembly 500.

FIG. 21 is an enlarged view of the Detail D, identified in FIG. 20, of the inventive cooking grate assembly 500.

DETAILED DESCRIPTION OF THE PREFERRED EMBODIMENTS

Figure 1:
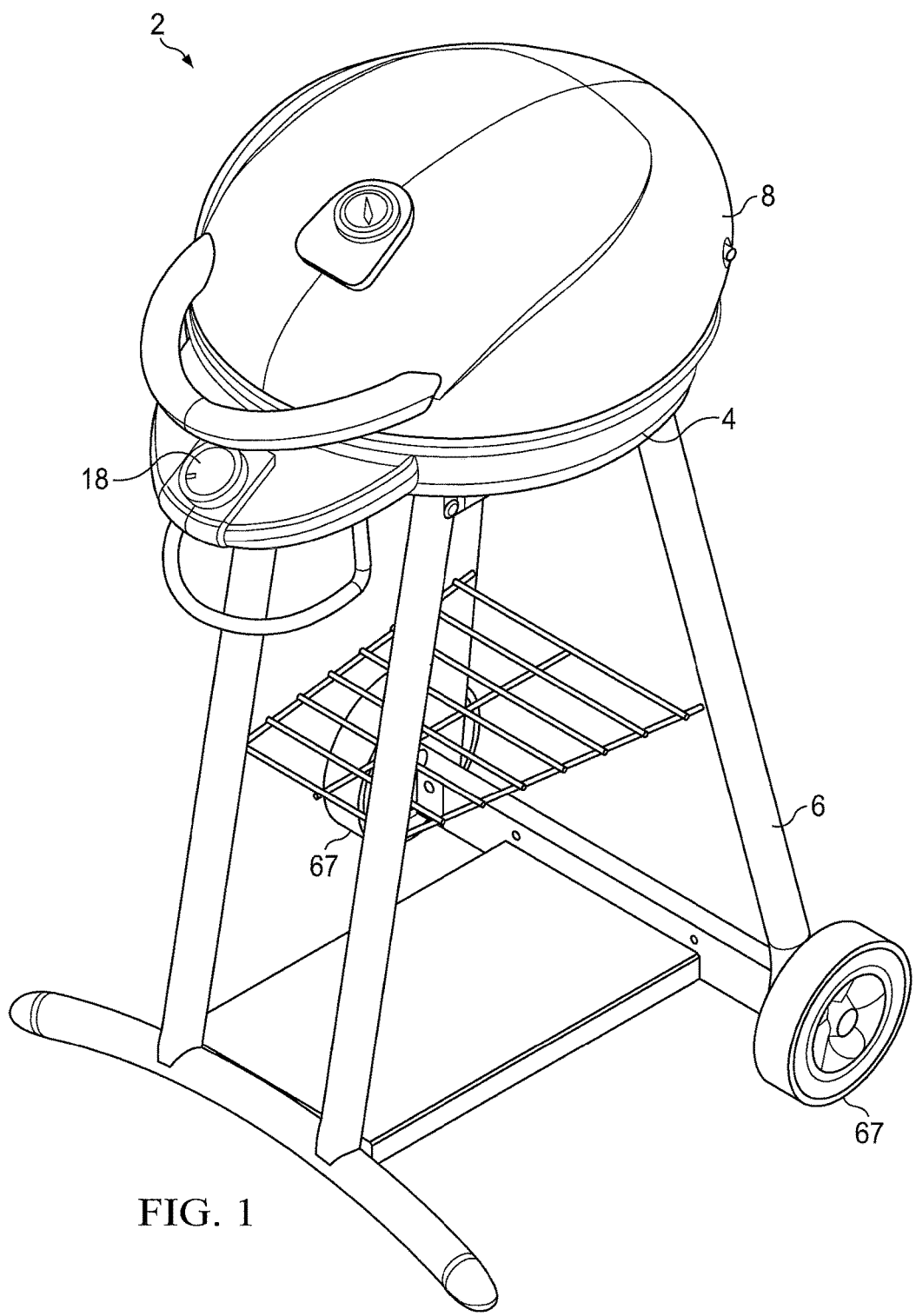
FIG. 1 is a perspective view of an embodiment 2 of the outdoor electric grill provided by the present invention.
Figure 2:
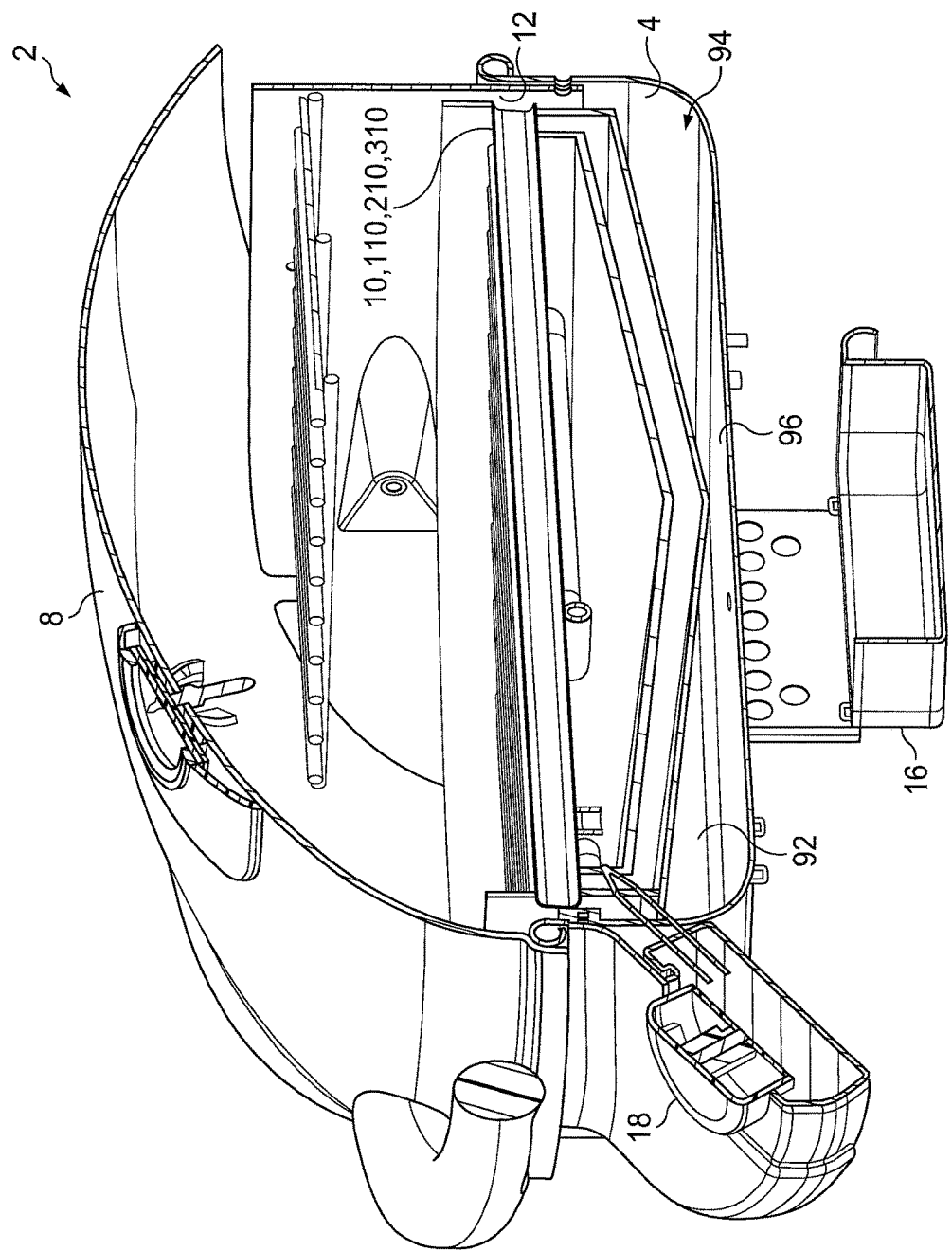
FIG. 2 is a cutaway elevational side view of the inventive grill 2.
Figure 3:
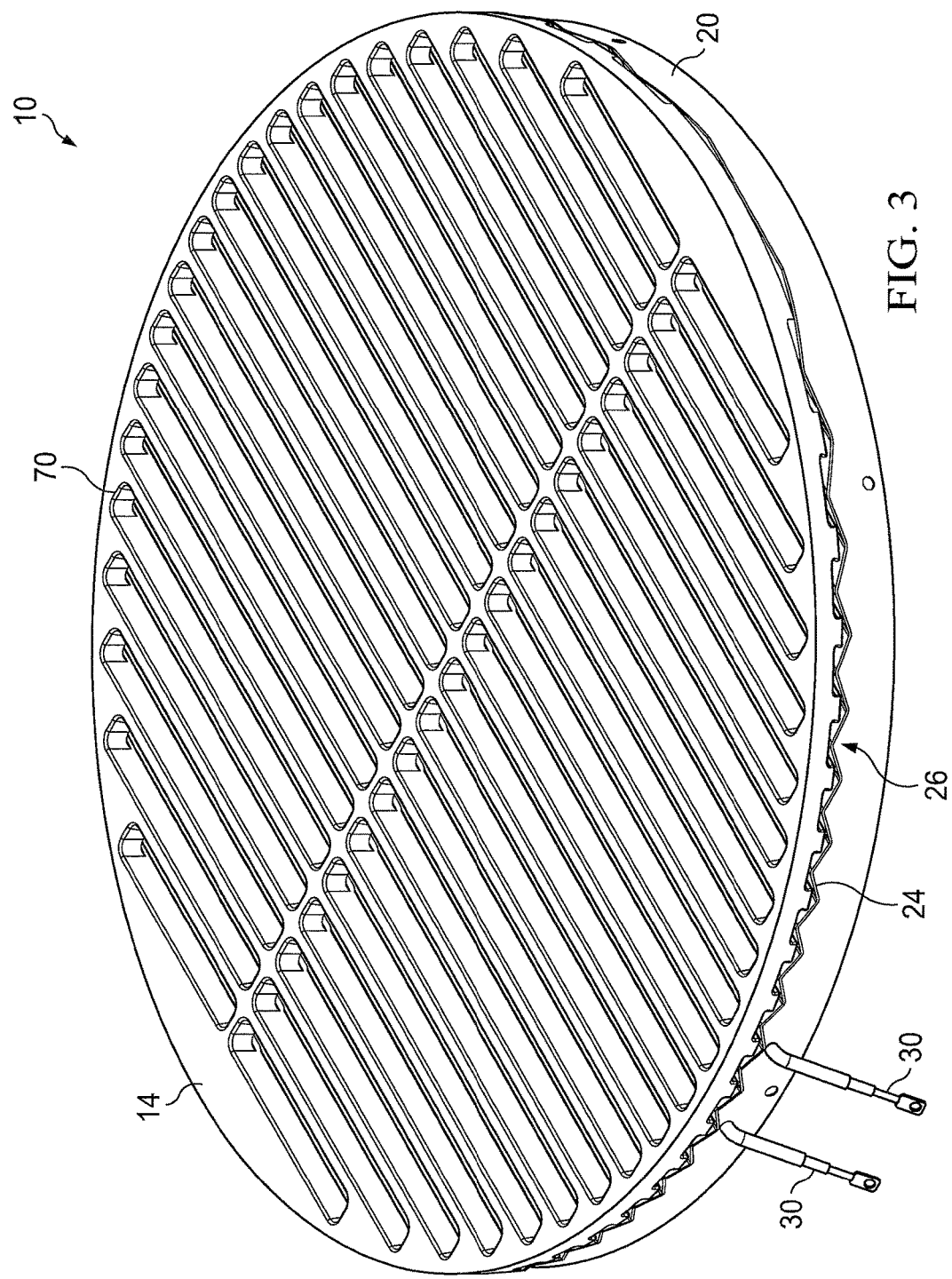
FIG. 3 is a perspective view of an embodiment 10 of the inventive module for radiating heat energy.

An embodiment 2 of an outdoor electric grill provided by the present invention is shown in FIGS. 1-3. The inventive electric grill 2 preferably comprises: a base housing 4; a support frame, housing, or other support structure 6 upon which the base housing 4 is mounted; a lid 8 which is pivotably attached to the base housing 4 or is otherwise provided for opening and closing the top of the base housing 4; an inventive electrically-powered heat radiating module 10 which is positioned within or at least partially within the upper portion 12 of the base housing 4; a food support grate 14 which is positioned on the heat radiating module 10; a drip pan or cup 16 in or beneath the base housing 4; and an exterior control panel 18 extending from the base housing 4.

An embodiment of the inventive electrically-powered heat radiating module 10 is further illustrated in FIGS. 3-9. The inventive module 10 preferably comprises: a module housing 20 having a heating cavity 22 therein; an emitter plate 24 on or in an upper portion 26 of the module housing 20; at least one electric heating element 28 positioned in the heating cavity 22 beneath the emitter plate 24; and electrical power leads 30 which preferably extend through the upwardly extending interior and exterior side walls 32 and 34 of the module housing 20.

The electric heating element 28 used in the heat radiating module 10 can be generally any type of electrical heating element which will radiate heat when current is applied. The electric heating element 28 will preferably be a tubular-type electric resistive heater. Tubular-type electric resistive heaters typically comprise a resistive metal wire which is mounted inside a metal tube filled with an electrically resistive but thermally conductive material such as, e.g., magnesium oxide. When an electrical current is applied to the metal wire, the outer metal tube, or sheath, will typically be heated to a temperature of up to as much as 1,000° to 1,200° F. or more.

Alternatively, the electric heating element 28 could be, for example, a high intensity infrared lamp element or an open ribbon resistive heater. In addition, if two or more separate electrical elements 28 are used in the inventive radiating module 10, the elements 28 can be separately controlled or can be operable such that any ratio of the power supply to the unit can be transmitted to the elements 28, so long as the total power consumed does not exceed, for example, the standard 1800 watt limit provided by electrical outlets in the U.S. or the standard 1500 watt limit provided by electrical outlets in Canada. The elements 28 could also be controlled to allow all of the power to be switched to one of the elements 28.

The housing 20 of the inventive heat radiating module 10 preferably comprises: a heating cavity bottom wall 36 beneath the heating element(s) 28; an inner side wall 32 which extends upwardly from the perimeter of the heating cavity bottom wall 36 and laterally surrounds the heating cavity 22; an exterior bottom wall 38 of the module housing 20 which is outside of and spaced apart from the heating cavity bottom wall 36; a bottom gap 40 defined between the heating cavity bottom wall 36 and the exterior bottom wall 38 of the module housing 20; at least one layer of insulating material 42 provided in the bottom gap 40 beneath the heating cavity 22; an exterior side wall 34 of the housing 20 which extends upwardly from the perimeter of the exterior bottom wall 38 and laterally surrounds the inner side wall 32; an upwardly extending gap 44 defined between the inner side wall 32 and the exterior side wall 34; at least one layer of insulating material 46 which is provided in the upwardly extending gap 44 such that the insulating layer 46 preferably laterally surrounds the heating cavity 22; and at least one infrared reflective radiation barrier surface 48 provided in the heating cavity 22 beneath the heating element(s) 28.

The reflective radiation barrier surface 48 can be the upper surface of the heating cavity bottom wall 36 or can be the upper surface of another wall within the heating cavity 22 positioned on or above the heating cavity bottom wall 36. When each electric element 28 is heated, it transmits radiant heat energy in both an upward direction and a downward direction. Typically, in most prior art electric grills, the radiant heat energy transmitted from bottom side of the element is mostly lost. However, in the inventive grill 2, the radiant energy transmitted from the bottom side of the electric heating element 28 is reflected upwardly by the radiation barrier surface 48 to the emitter plate 24 for (a) cooking the food more efficiently, (b) assisting in reducing the warmup time of the inventive grill 2, and (c) achieving higher cooking and searing temperatures. The radiation barrier surface 48 can be formed of any temperature resistant infrared reflective material which is effective for achieving these results. The radiation barrier surface 48 is preferably formed of reflective aluminum or stainless steel in single or multiple layers.

To further reduce the loss of heat from the heating cavity 22, the exterior bottom of the heating cavity 22 is preferably covered, as indicated above, by the layer of insulating material 42 provided in the bottom gap 40. In addition, the heating cavity 22 is also preferably surrounded laterally by the above-mentioned layer of insulating material 46 which is provided in the upwardly extending gap 44. The insulating layers 42 and 46 can be formed of any insulating material suitable for use at temperatures of as much as 1500° F. or more and will preferably be formed of non-flammable cotton or fiber glass.

It will also be understood that the lid 8 of the inventive grill 2 can also optionally include heat reflective and/or insulating surfaces or materials in order to further decrease warm up time, and increase overall efficiency. By way of example, but not way of limitation, examples of such features which can be used in the lid 8 are provided in U.S. Pat. No. 6,104,004, the entire disclosure of which is incorporated herein by reference.

The emitter plate 24 of the inventive heat radiating module 10 has an upper emitting surface 50. The upper emitting surface 50 can be flat (see, e.g., the flat emitter plat 224 used in the alternative embodiment 210 of the inventive heat radiating module shown in FIGS. 12 and 13) or can have ridges and valleys or other features formed or provided thereon. To operate more effectively in conjunction with the food support grate 14 to facilitate the flow of fat drippings off of the emitter plate 24 and to reduce or prevent flare-ups even at the higher operating temperatures provided by the inventive electric grill 2, the upper emitting surface 50 preferably comprises an alternating series of ridges 52 and valleys 54.

The emitter plate 24 shown in FIGS. 3-9 can be preferably stamped, cast or molded, or otherwise produced from a sheet of material so that corresponding ridges and valleys are also formed on the bottom side 56 of the emitter plate 24. The flat emitter plate 224 shown in FIGS. 12 and 13, on the other hand, can also be cast, molded, etc., or can be formed, for example, of ceramic glass or a metallic plate.

In another alternative embodiment 310 of the inventive heat radiating module illustrated in FIGS. 14 and 15, the emitter plate 324 thereof can be cast or molded out of a suitable material such that the bottom side 327 of the emitter plate 324 is a flat surface but the upper emitting surface 350 has ridges 352 and valleys 354 formed therein. Examples of suitable materials for forming the emitter plate 324 include, but are not limited to, procelainized iron or steel, stainless steel, or ceramic glass.

The inventive heat radiating module 10, 110, 210, 310 (or just the emitter plate 24, 124, 224, 324 and the cooking grate 14, 114, 214, 314 thereof) can be mounted with a downward slope front to back to speed up grease drainage and thus help keep the plate 24, 124, 224, 324 clean so that less maintenance is required by the consumer and, during the cooking cycle, a dry surface is provided to help produce and emit more radiation energy to the food.

Figure 11:
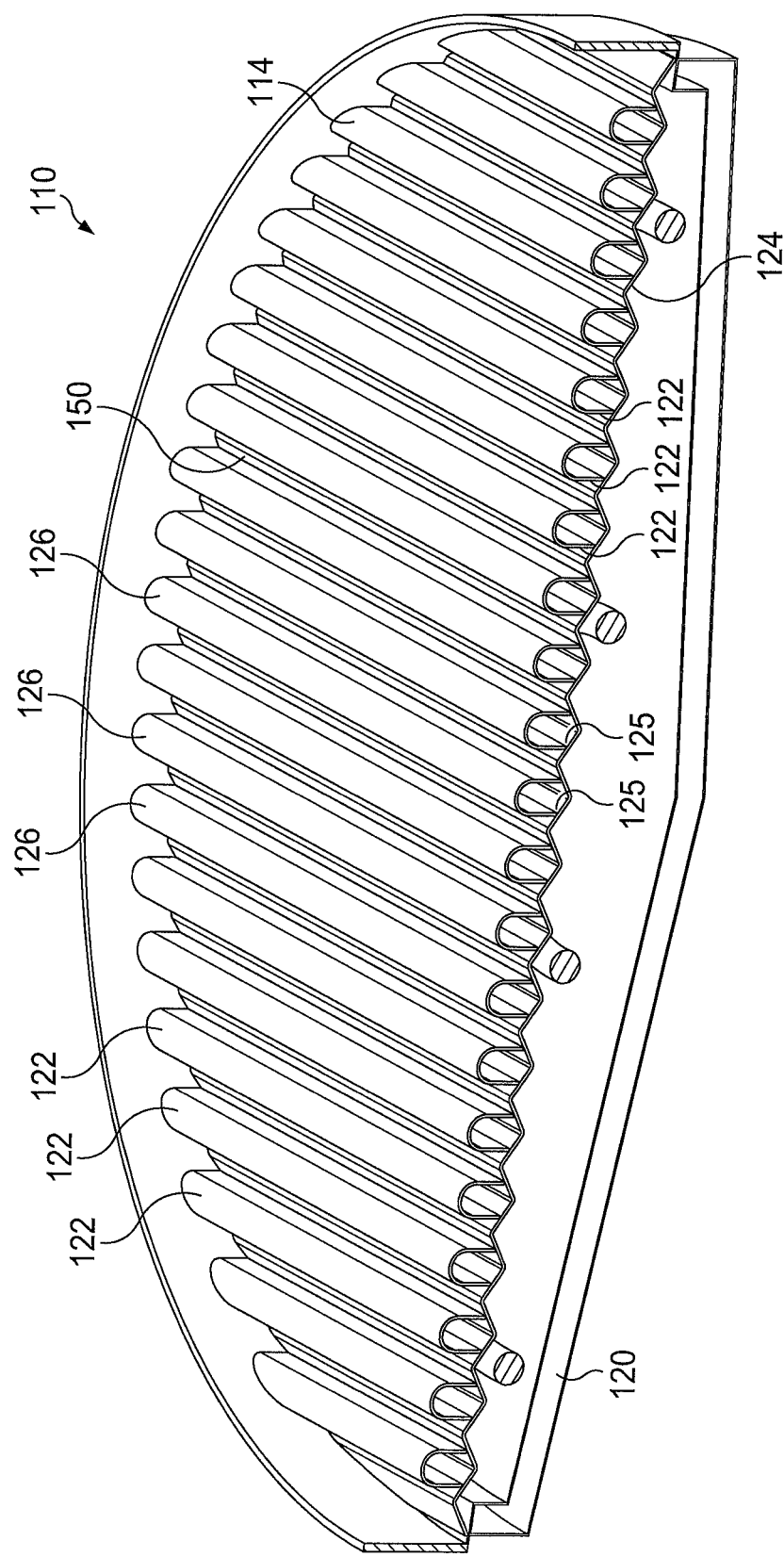
FIG. 11 is a cutaway perspective view of an alternative embodiment 110 of the inventive electrically-powered module for radiating heat energy comprising inverted U-shaped food support ribs 122.

Although other shapes can also be used, the ridges 52 of the emitter plate 24 shown in FIGS. 3-9 (as well as the ridges of the emitter plates 124 and 324 illustrated in FIGS. 11 and 14-15 will preferably have either (a) an inverted V shape with a peak 58 which can be sharp or rounded or (b) an angled lower portion which is combined with an upper peak portion having more of an inverted U shape. Similarly, the valleys 54 of the emitter plate 24 (as well as those of the emitter plates 124 and 324) will preferably have bottoms 60 which are sharply angled, rounded, or U-shaped. Each of the ridges 52 of the emitter plate 24, and of the emitter plates 124 and 324 of FIGS. 11 and 14-15, will preferably have a height in the range of from about 0.125 to about 0.375 inches and a base width in the range of from about 0.25 to about 0.5 inches.

The upper emitting surface 50 of the emitter plate 24, as well as the upper emitting surfaces of the emitter plates 124, 224, and 324 shown in FIGS. 11-15, will preferably be formed of a suitable high temperature material or coating which has an emissivity of at least 0.4 and which more preferably has an emissivity in the range of from about 0.5 to about 0.9. Examples of suitable materials for forming the emitter plate 24 include, but are not limited to, porcelain-coated steel, titanium, stainless steel, and aluminized or galvanized steel. The emitter plate 24 will preferably be formed of porcelain-coated steel or 304 stainless steel.

The food support grate 14 shown in FIGS. 3-5 and 8-9 comprises a plurality of side-by-side food support ribs 65 having gaps 66 therebetween. The ribs 65 are solid structures which, in cross section, have a partial, inverted V shape. The ribs 65 have upper surfaces 68 which together form a food support surface 70 which is spaced above the upper emitting surface 50 of the emitter plate 24. The ribs 65 also have bottom portions 72 which are positioned in the valleys 54 of the emitter plate 24 such that shielded flow channels 74 for the fat and water which falls onto the emitter plate 24 during the cooking process are defined in the valleys 54 beneath the bottom portions 72 of the ribs 65.

The food support ribs 114 and 314 used in FIGS. 11 and 14-15, on the other hand, have a hollow, inverted U shape. However, the ribs 114 and 314 also operate to form shielded flow channels beneath the ribs 114 and 314.

Figure 4:
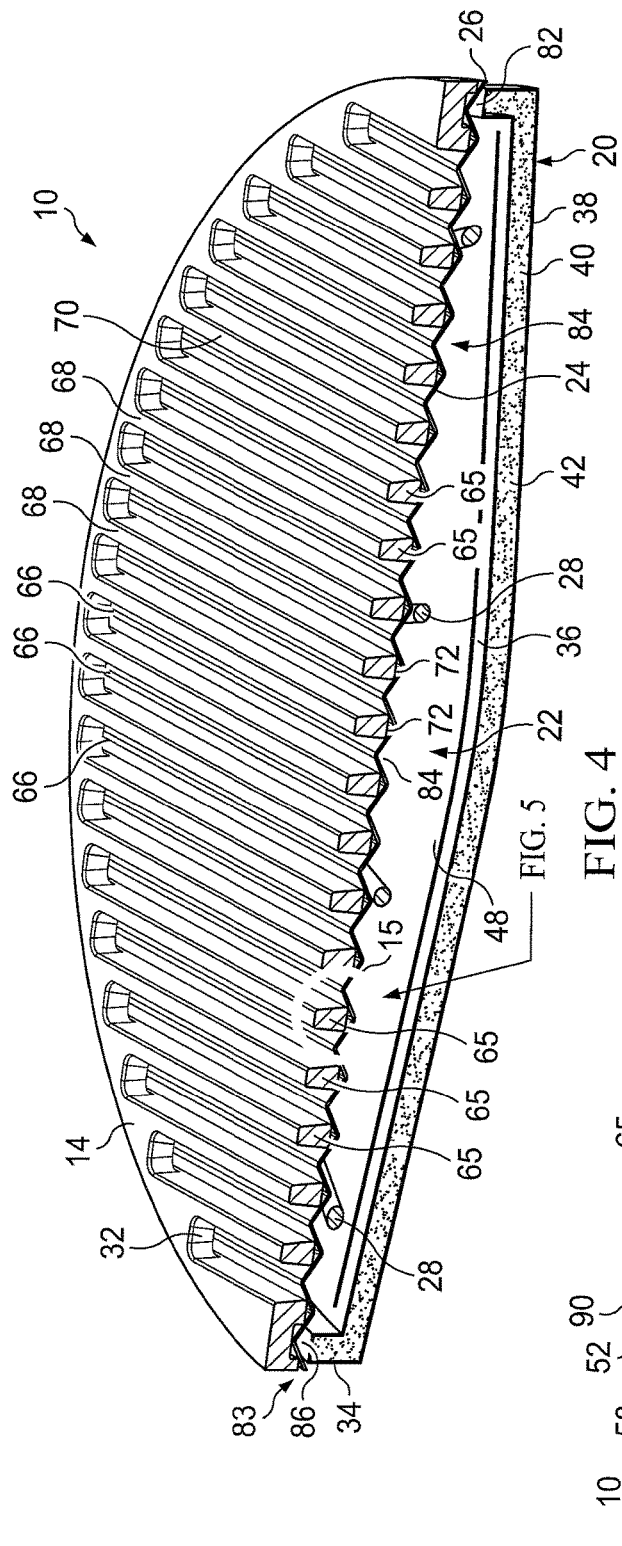
FIG. 4 is a cutaway perspective view of the inventive heating module 10 having a food support grate 14 positioned thereon.
Figure 5:
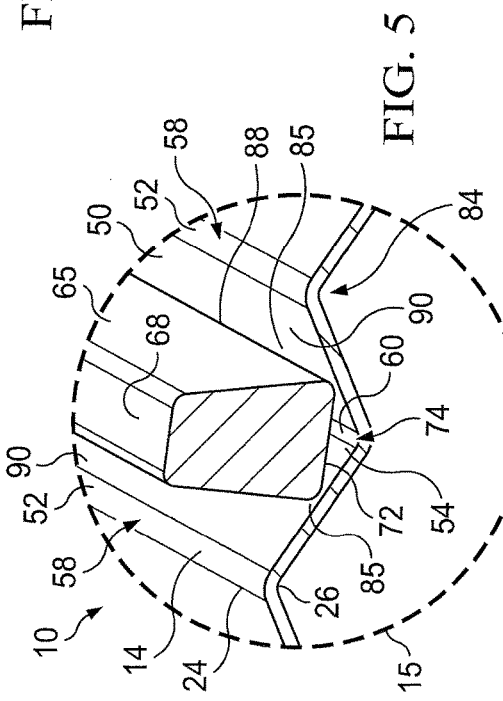
FIG. 5 is an enlarged view of the section 15, identified in FIG. 4, of the inventive heat radiating module 10.
Figure 6:
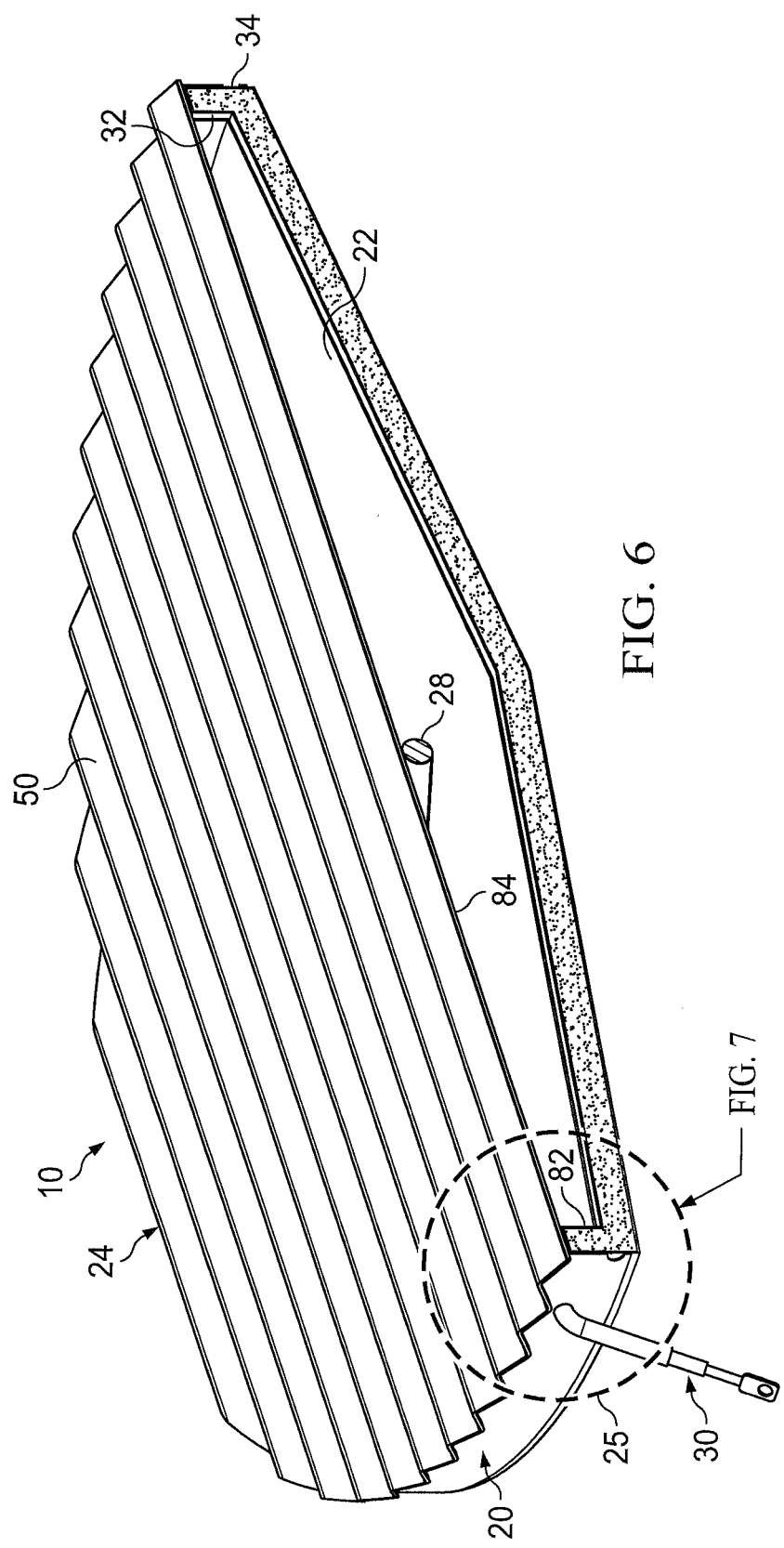
FIG. 6 is a cutaway perspective view of the inventive heating module 10 without a food support grate being positioned thereon.
Figure 7:
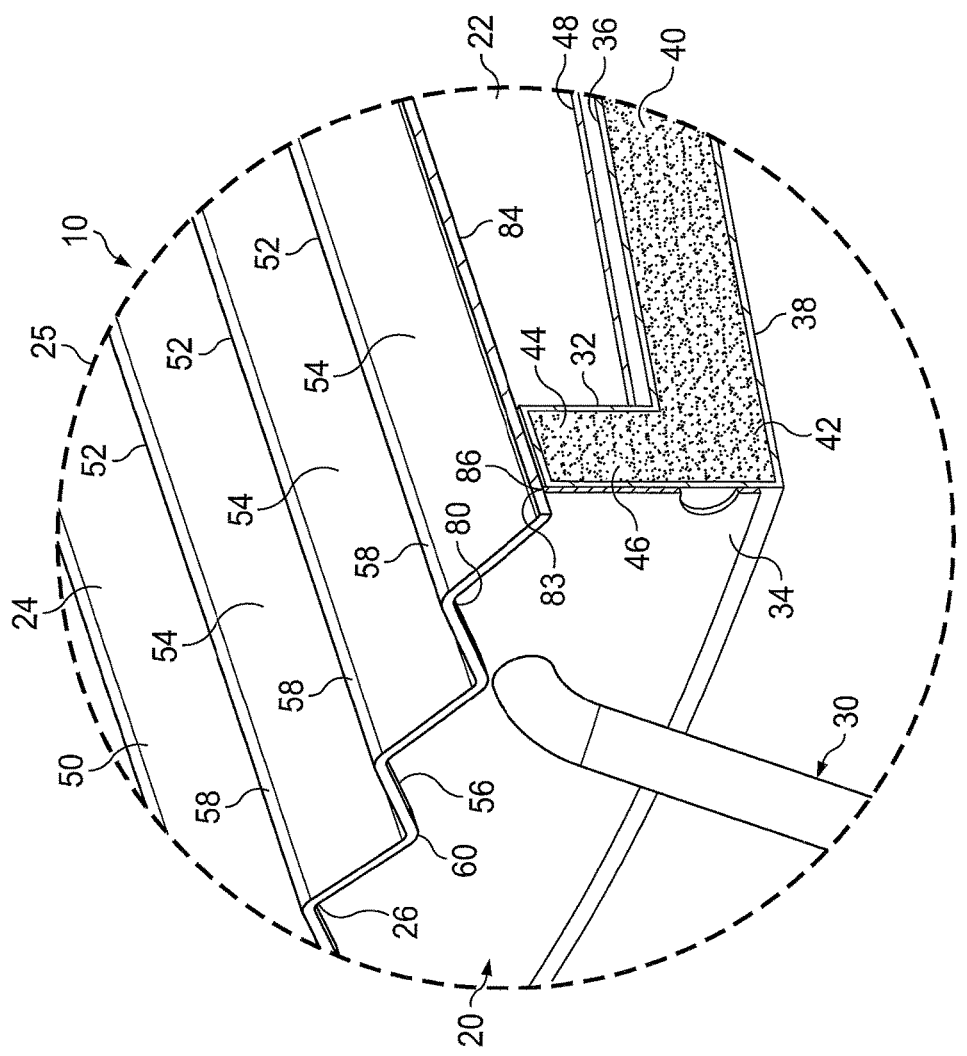
FIG. 7 is an enlarged view of the section 25, identified in FIG. 6, of the inventive heat radiating module 10.

It will also be understood, however, that the food support ribs used in any of the embodiments of the present invention can alternatively have a rectangular shape, a sharp or rounded inverted V shape, or generally any other shaped desired. Also, the ribs 65, 122, 222, 322 can be solid structures as illustrated in FIGS. 4 and 5, at least partially hollow structures, or hollow structures as illustrated in FIGS. 11-15. In addition, the bottoms 125, 225, 325 of the hollow or partially hollow ribs 122, 222, 322 can be open as shown in FIGS. 11-15, or closed. The upper surfaces 68, 126, 226, 326 of the food support ribs 65, 122, 222, 322 can be flat surfaces as illustrated in FIGS. 4 and 5, rounded surfaces as illustrated in FIGS. 11-15, or sharp or rounded peaks or edges. By way of example, but not by way of limitation, the food support grate 14, 114, 214, 314 will preferably be formed of high temperature porcelain coated steel, stainless steel, hard anodized aluminum, or titanium.

To reduce flare-ups in the past, in addition to operating at lower temperatures, the height of the food support ribs used in the prior art electric grills have typically been 0.75 inch or more. Tall ribs of this height have been necessary in order to sufficiently reduce the amount of oxygen available for combustion at the bottom of the gaps between the ribs. However, these tall ribs have also further reduced the efficiency of the prior art grills.

For the inventive heat radiating module 10 shown in FIGS. 3-9, and as will also be true for the alternative modules 110 and 310 shown in FIGS. 11 and 14-15, the shielded flow channels 74 created beneath the food support ribs operate to reduce the amount of oxygen available to the fat which flows into and through the flow channels 74 to such a degree that, even at the higher operating temperatures which are provided by the inventive grill 2, the inventive grill 2 will still be highly flare-up resistant at a much shorter, and more efficient, rib height of 0.5 inch or less. Consequently, although taller food support ribs can also be used, and may be desirable for example when using an alternative flat emitter plate 224 as illustrated in FIGS. 12 and 13, the food support ribs of the food support grate 14, 114, 314 will preferably have a height in the range of from about 0.25 to about 0.5 inches and a bottom width in the range of from about 0.25 to about 0.4 inches.

Moreover, by preventing flare-ups at significantly higher operating temperatures, the shielded flow channels 74 formed by the emitter plate 24 124, 324 and the food support grate 14, 114, 314 of the inventive grill 2 also (a) cause a greater amount of vaporization and smoke generation to occur for flavoring the food and (b) prevent the emitter plate 24, 124, 324 from being cooled by the liquid fat when operating at lower settings below the vaporization point.

Although not mandatory, the food support grate 14, 114, 214, 314 of the inventive grill 2 will preferably be removably positionable on the upper emitting surface 50, 150, 250, 350 of the emitter plate 24, 124, 224, 324. In addition, although the emitter plate 24, 124, 224, 324 can be permanently attached to the top of the housing 20, 120, 220, 320 of the inventive heat radiating module 10, 110, 210, 310, the emitter plate will preferably be removably positionable on the housing for ease of maintenance and replacement of the electric heating element(s) 28 and to better accommodate the thermal expansion of the housing components which can occur during operation.

In the inventive heat radiation module 10 as illustrated in FIGS. 4-9, and as will preferably also be the case in modules 110 and 310, corrugated ridges 80 or other shapes corresponding, to the ridges 52 and valleys 54 of the emitter plate 24 are provided in the upper ends of the upwardly extending inner side wall 32, exterior side wall 34, and insulating layer 46 of the module housing 20 for placement of the emitter plate 24 on the housing 20. The upper end 82 of the inner side wall 32 defines the outer perimeter of the upper end 84 of the heating cavity 22. The upper end 86 of the exterior side wall 34 defines the outer perimeter of the upper end 83 of the module housing 20.

Still referring to FIGS. 4-9 for purposes of illustration, the liquefied fat and water which drips onto the emitter plate 24 from the food product quickly enters the flow channels 74 beneath the ribs 65 through gaps 85 existing between the bottom contacting edges 88 of the ribs 65 and the valley walls 90 of the upper emitting surface 50 of the emitter plate 24. These gaps 85 exist as a natural consequence of the fact that the stamping, casting, shearing, bending, and/or other procedures used for forming the components of the heat radiating module 10 and the food support grate 14 do not provide a precise, theoretical line to line contact between the food support ribs 65 and the emitter plate 24. Consequently, the low viscosity of the hot liquefied fat allows it to flow quite readily through the small gaps 85 and into the flow channels 74.

As the liquefied fat enters the shielded flow channels 74, it flows toward the edge of the emitter plate 24. Preferably, the valleys 54 of the upper emitting surface 50 of the emitter plate 24 extended at least as far as, and more preferably beyond, the outer perimeter 86 of the upper end 83 of the module housing 20 so that the liquefied fat and water from the food product falls from the outer ends of the valleys 54 into the interior cavity 92 of the grill base housing 4 outside of the housing 20 of the inventive heat radiating module 10.

Similarly, if an entirely flat emitter plate 224 or an emitter plate with other features provided thereon is used, the outer perimeter of the emitter plate will preferably extend at least as far as, and more preferably beyond, the outer perimeter of the upper end of the module housing.

If desired, the emitter plate 24 or the valleys 54 thereof can be oriented, formed, or configured at a slight angle as mentioned above to facilitate and/or accelerate the flow of the liquefied fat and water off of the emitter plate 24.

Due to (a) the isolation of the heating element(s) 28 in the inventive heat radiating module 20 and (b) the thermal insulation 42 provided beneath the bottom of the module heating cavity 22, the temperatures in the bottom portion 94 of the grill base housing 4 beneath the heat radiating module 10 are too low for ignition of the liquefied fat to occur. Consequently, the liquefied fat and water which fall onto the bottom wall 96 of the grill base housing 4 simply flow into the drip pan or cup 16 for recovery. Although the interior bottom wall 96 of the grill base housing 4 is illustrated in FIG. 2 as being substantially flat, it will be understood that bottom 96 can be downwardly sloped to further facilitate the drainage of the fat into the drip pan or cup 16 located on or beneath the bottom 96.

In the inventive electrically-powered module 10 for radiating heat energy, as well as in each of the other embodiments 105, 110, 210, and 310 thereof, the volume of the heating cavity 22 of the module is preferably significantly smaller than the firebox cavity volumes heretofore used in prior art electric grills for holding the electric heating element. Referring to FIGS. 4-9 for purposes of illustration, given any area of A in$^2$ for the upper end 84 of the heating cavity 22 beneath the emitter plate 24, the volume of the heating cavity 22 below the emitter plate 24 will preferably not be more than $(3 \times A)$ in$^3$ and will more preferably not be more than $(1.5 \times A)$ in$^3$. Most preferably, the volume of the heating cavity 22 will not be greater than A in$^3$.

This much smaller volume of the heating cavity 22 beneath the emitter plate 24 (a) further increases the reflection and recovery of the radiant energy which is emitted downwardly from the heating element(s) 28 or which is otherwise directed toward the bottom of the heating cavity 22 and (b) reduces the volume of air in the cavity 22 which must be heated and maintained at operating temperature. In addition, the reduced depth of the heating cavity 22 produces an appealing thinner profile for the inventive grill 2 and reduces material costs.

More preferably, the dimensions of the smaller heating cavity 22 of the inventive heat radiating module will be such that: (a) the vertical distance from the bottom wall 36 of the heating cavity 22 to the center of the emitter plate 24 will be in the range of from about 1.0 to about 3.0 inches and will more preferably be about 1.5 inches; (b) the vertical distance from the bottom wall 36 of the heating cavity 22 to the outer edge portion of the emitter plate 24 will be in the range of from about 0.5 to about 1.0 inches and will more preferably be about 0.5 inches; (c) the electric heating element(s) 28, which will typically have a diameter of about 0.3 inches, is/are in close proximity to or touching the emitter plate 24; (d) the vertical distance from the heating element(s) 28 to the center of the radiation surface barrier 48 will be in the range of from about 0.7 to about 2.7 inches and will more preferably be about 1.2 inches; and (e) the vertical distance from the heating element(s) 28 to the outer edge portion of the radiation surface barrier 48 will be in the range of from about 0.2 to about 0.7 inches and will more preferably be about 0.2 inches.

In addition, the emitter plate 24, 124, 224, 324 of the inventive heat radiating module preferably covers and substantially closes the upper end 84 of the heating cavity 22 such that the upper end 84 of the heating cavity 22 is at least 95% closed, more preferably at least 99% closed, to air flow into or out of the heating cavity 22 through the upper end 84 of the cavity 22. As used herein and in the claims, this means that the total area of all apertures, cracks, gaps, or other openings into the upper end 84 of the heating cavity 22 through the emitter plate 24, 124, 224, 324 or between the emitter plate and the upper surrounding edge 82 of the heating cavity 22 will preferably not be more than 5%, more preferably not more than 1%, of the area of the upper end 84 of the heating cavity 22. Most preferably, there are no openings through the emitter plate 24, 124, 224, 324.

Similarly, the housing 20, 120, 220, 320 of the inventive heat radiating module 10, 110, 210, 310 is preferably at least 95% closed, more preferably at least 99%, closed, to air flow into or out of the heating cavity 22. As used herein and in the claims, this means that the total area of all apertures, cracks, gaps, or other openings through the heating cavity bottom wall 36 of the housing 20, 120, 220, 320 and the inner side wall 32 of the housing which laterally surrounds the heating cavity 22 will preferably not be more than 5%, more preferably not more than 1%, of the total outer boundary limit area of the heating cavity 22 below the upper opening 84 (i.e., the total solid area of the inner surfaces of the heating cavity bottom wall 36 and the upwardly extending inner side wall 32 assuming that no cracks, gaps, or other openings are present).

By significantly reducing the size and/or number of, or substantially eliminating (or entirely eliminating), all cracks, gaps, or other air openings into the heating cavity 22 of the inventive heat radiating module 10, 110, 210, 310, the flow of cold air into the unit and past the electric heating element(s) 28 and the emitter plate 24, 124, 224, 324 is substantially eliminated, thus significantly improving the efficiency and thermal performance of the inventive grill 2. Moreover, this result is achieve in the inventive grill 2 even though the inventive heat radiating module 10, 110, 210, 310 is preferably not hermetically sealed, thus preventing added cost and allowing the inventive module to better accommodate thermal expansion of the system components during operation.

In addition, the substantial closure of the heating cavity 22 as described above reduces convective heat transfer to the food product and increases the percentage of total heat flux from infrared radiation at 3 mm above the food contacting surface 70 to more than 70% and more preferably at least 72%. Measurements taken during actual tests of the inventive grill 2 and module 10 of FIGS. 1-9 indicated that infrared radiant energy accounted for 74.97% of the total heat flux.

The emitter plate 24, 124, 224, 324 and the module housing 20, 120, 220, 320 are also preferably at least 95% closed, more preferably at least 99% closed, to any flow of fat and water from the upper emitting surface 50, 150, 250, 350 of the emitter plate 24 into the heating cavity 22. As used herein and in the claims, this means that the total area of all apertures, cracks, gaps, or other openings through which fat or water from the food can flow into the upper end 84 of the heating cavity 22 through the emitter plate 24, 124, 224, 324 or between the emitter plate 24, 124, 224, 324 and the upper surrounding edge 82 of the heating cavity 22 will preferably not be more than 5%, more preferably not more than 1%, of the area of the upper end 84 of the heating cavity 22. Most preferably, the inventive electrically-powered heat radiating module 10, 110, 210, 310 is entirely closed to the flow of fat and water from the food into the heating cavity 22.

Preventing the flow or leakage of fat and water into the inventive heat radiating module (a) preserves, protects, and extends the life of the electric heating element(s) 28 and the bottom and side insulating materials 42 and 46, (b) prevents fouling of the radiation barrier surface 48 in the bottom of the heating cavity 22 so that the effectiveness of the radiation barrier surface 48 for reflecting radiant energy upwardly toward the emitter plate 24, 124, 224, 324 is preserved, and (c) prevents flare-ups and burning fat with resultant black smoke. Moreover, preventing the flow of fat from the food into the heating cavity 22 eliminates the need for a drainage opening in the bottom of the module housing 10, 110, 210, 310 which would also permit cold air to flow into the heating cavity 22.

Because of the significant improvements in operation and thermal efficiency achieved by the inventive grill 2 and the inventive heat radiating module 10, 110, 210, 310, the inventive grill 2 and module 10, 110, 210, 310 will provide an average heat flux of at least 7.5 kW, more preferably at least 8.0 or at least 8.5 kW, per square meter of cooking area on the cooking surface 70 at the highest cooking setting of the inventive heat radiating module 10, 110, 210, 310 when the lid 8 of the grill 2 is closed and the heat radiating module is connected to a standard 120 volt, 1800 watt electrical outlet.

In actual tests of the inventive electric grill 2 and heat radiating module 10 of FIGS. 1-9 compared to a prior art electric grill of the same size built according to the specification of U.S. Pat. No. 8,399,810, the inventive grill 2 produced an average heat flux of 9.897 kW/m$^2$ across the cooking surface versus a heat flux of 5.318 kW/m$^2$ for the prior art grill, an improvement of 86%. In addition, the inventive electric grill 2 reached an average grate temperature of 464° F. in just 15 minutes whereas the average grate temperature of the prior art electric grill after 15 minutes was only 153° F.

Moreover, with the lid 8 closed, the inventive grill 2 is capable of achieving an ultimate high temperature at the cooking grate 14, 110, 210, 310 of as much as 900° F. as compared to what is believed to be a possible maximum for some prior electric grills of perhaps 600° F. Further, even with the lid 8 open, the inventive electric grill 2 and the inventive heat radiating module 10, 110, 210, 310 are capable of providing an average grate temperature of up to 650° F. and excellent sear marks.

Although various types of power and cooking control systems 18 can be used for the inventive electric grill 2 and the inventive heat radiating module 10, 110, 210, 310, the controller 18 will preferably be a time proportional controller or a bimetallic, electrical controller of the type known in the art. Examples of other control systems which could be used include, but are not limited to, electric power controllers using either voltage or duty cycle control either with or without electronic thermostatic control.

The support frame, housing, or other structure 6 upon which the inventive grill 2 is mounted can optionally include one pair, two pair, or any other desired number wheels 67 for easy movement and storage.

Figure 10:
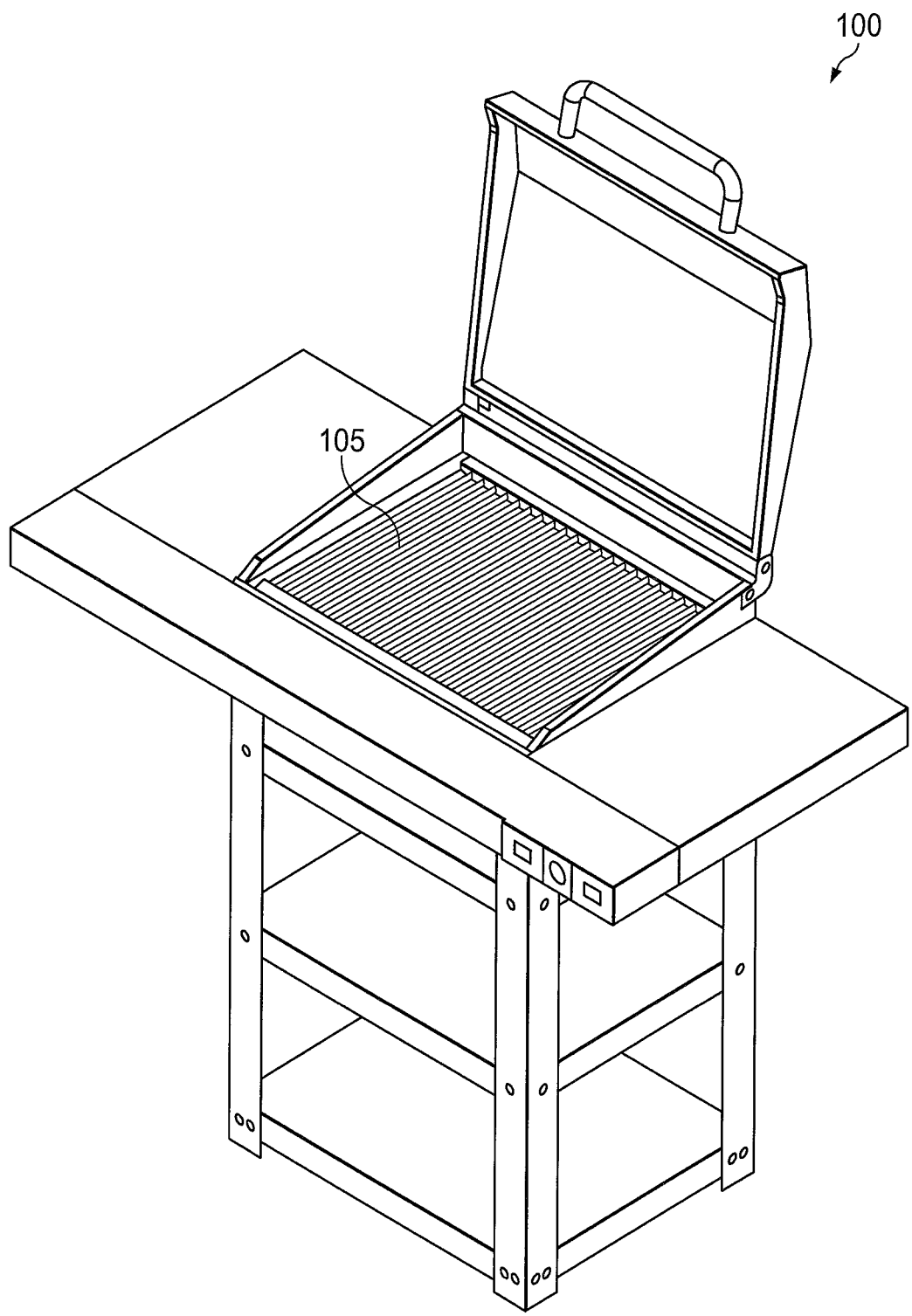
FIG. 10 is a perspective view of an alternative rectangular embodiment 100 of the inventive electric grill and an alternative rectangular embodiment 105 of the inventive electric module for radiating heat energy.

Although the inventive electric module 10, 110, 210, 310 for radiating heat energy will preferably be removably positionable in the grill base housing 4, the housing 20, 120, 220, 320 of the module 10, 110, 210, 310 can alternatively be provided or constructed in, or at least partially in, the interior cavity 92 of the grill base housing 4 as a permanent, or at least more permanent, interior housing 20, 120, 220, 320. In addition, examples of other alternatives for the inventive grill 2 and the inventive heat radiating module 10 include, but are not limited to: the use of one or more open ribbon resistance heaters as the heating element(s) 28 as mentioned above; and constructing the inventive electric grill 2 and the inventive heat radiating module 105 in a rectangular shape, as illustrated in FIG. 10, or oval or other shape rather than the circular shape illustrated in FIGS. 1-9.

Also, as another alternative, it will be understood that the emitter plate 24, 124, 224, 324 and the food support grate 14, 114, 214, 314 used in each of the inventive heat radiating modules 10, 110, 210, 310 can be employed apart from the remaining components of the module to provide an inventive infrared cooking grate assembly which can be used in any type of gas, charcoal, electric or other grill.

Figure 16:
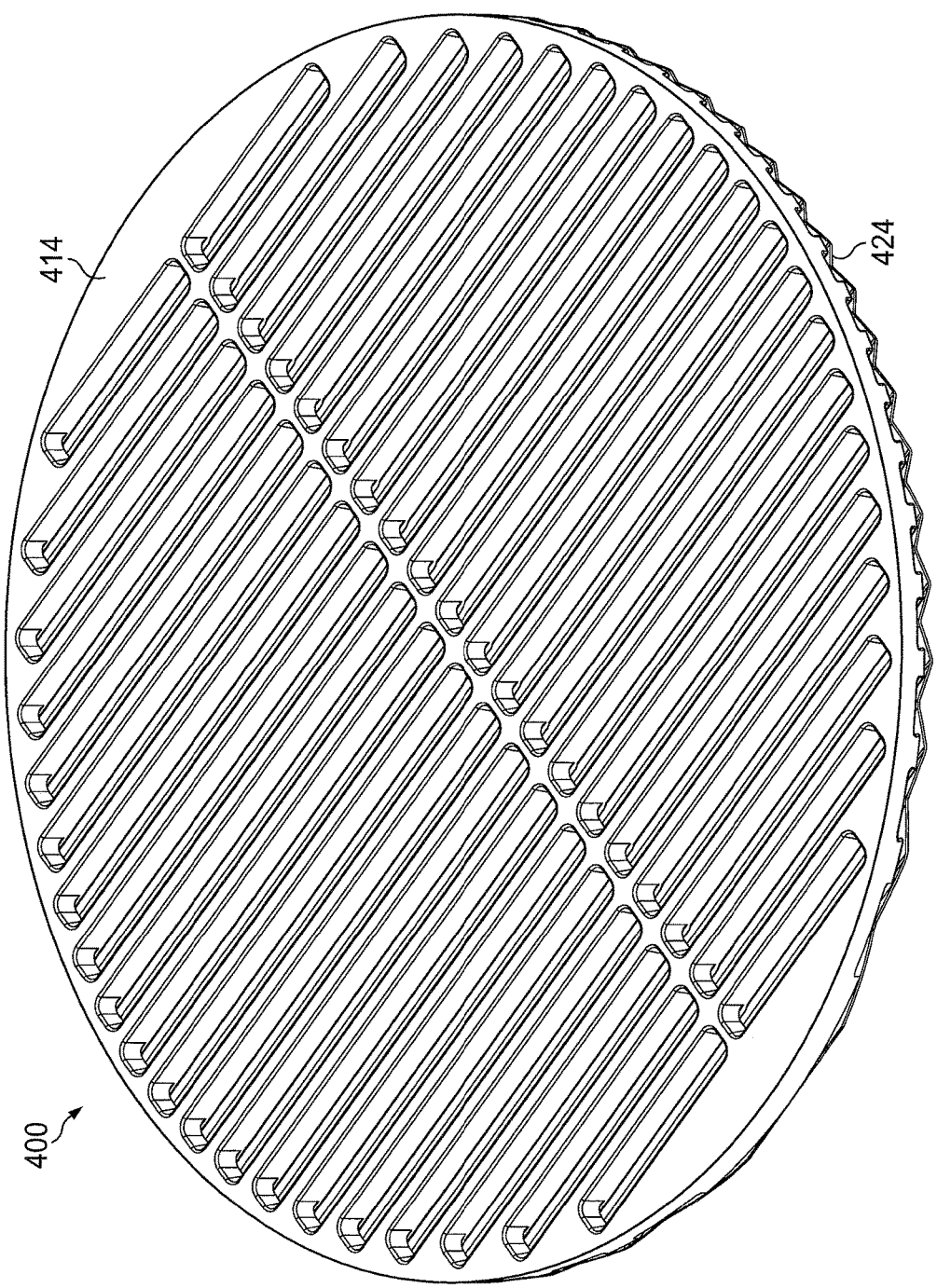
FIG. 16 is a perspective view of an embodiment 400 of an infrared cooking grate assembly provided by the present invention.
Figure 19:
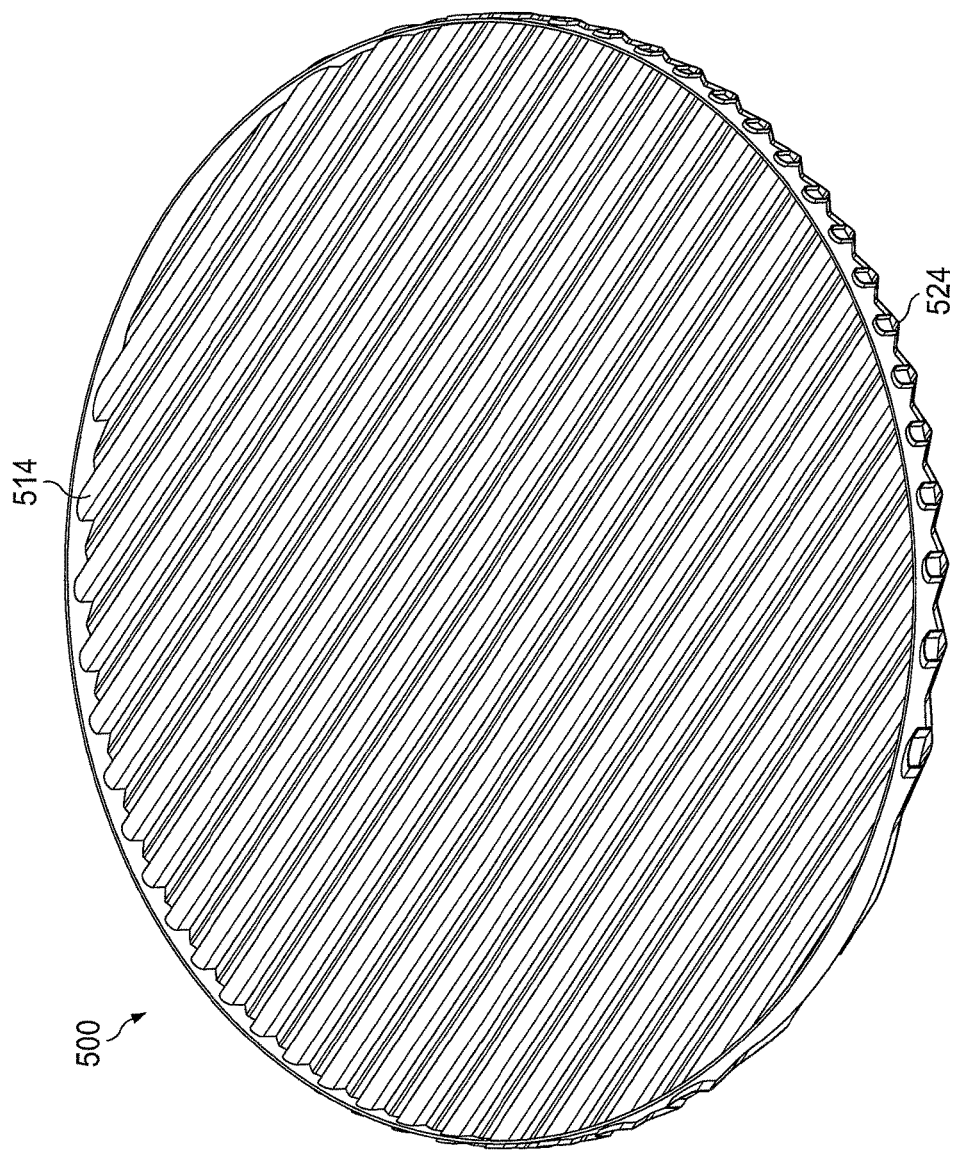
FIG. 19 is a perspective view of an embodiment 500 of the infrared cooking grate assembly provided by the present invention.

An example of one such embodiment 400 of the inventive cooking grate assembly comprising a food support grate 414 of the same type shown in FIGS. 3-5 and 8-9 removably positionable on an emitter plate 424 of the same type shown in FIGS. 3-9 is illustrated in FIGS. 16-18. An example of another embodiment 500 of the inventive cooking grate assembly comprising a food support grate 514 of the same type shown in FIG. 11 removably positionable on an emitter plate 524 of the same type shown in FIG. 11 is illustrated in FIGS. 19-21. The inventive cooking grate assemblies are highly resistant to flare-ups, are low cost, and provide a high percentage of infrared cooking energy.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. A module for radiating heat energy for cooking food comprising:

a module housing having a heating cavity therein, said module housing having a housing bottom wall and an upwardly extending housing outer side wall, said heating cavity having a heating cavity bottom wall and an upwardly extending heating cavity side wall, said heating cavity bottom wall is positioned above said housing bottom wall to form a bottom gap between said heating cavity bottom wall and said housing bottom wall, said heating cavity side wall laterally surrounds said heating cavity, said housing outer side wall laterally surrounds and is spaced apart from said heating cavity side wall to form an upwardly extending annular gap between said housing outer side wall and said heating cavity side wall, said upwardly extending annular gap laterally surrounds said heating cavity, an upper end of said heating cavity side wall defines an outer perimeter of an upper end of said heating cavity, and an upper end of said housing outer side wall defines an outer perimeter of an upper end of said module housing;

an emitter plate on said upper end of said module housing, said emitter plate having an upper emitting surface, said upper emitting surface comprising an alternating series of parallel, longitudinal ridges and valleys, said emitter plate having an outer perimeter, and said emitter plate having no openings therethrough; and at least one electric heating element positioned in said heating cavity beneath said emitter plate;

wherein said housing bottom wall and said heating cavity bottom wall have no openings therethrough;

said outer perimeter of said emitter plate is positioned on or extends beyond said outer perimeter of said upper end of said module housing such that said emitter plate covers and closes said upper ends of said heating cavity and said module housing such that said upper end of said heating cavity is at least 99% closed to air flow out of or into said upper end of said heating cavity;

said emitter plate and said module housing are closed to flow from said upper emitting surface of said emitter plate into said heating cavity of fat and water falling onto said upper emitting surface from said food; and each longitudinal end of each of said longitudinal ridges and valleys of said upper emitting surface of said emitter plate extends at least as far as said outer perimeter of said upper end of said module housing so that fat and water which falls onto said upper emitting surface from said food is delivered by said longitudinal ridges and valleys to a location outside of said module housing.

2. The module of claim 1 wherein said module housing is at least 99% closed to air flow into or out of said heating cavity.

3. The module of claim 1 wherein said upper end of said heating cavity beneath said emitter plate has an area of A in² and a total volume of said heating cavity beneath said emitter plate is not more than (1.5×A) in³.

4. The module of claim 1 further comprising a food support grate which is positionable on said emitter plate, said food support grate having a food support surface which is spaced above said upper emitting surface of said emitter plate.

5. The module of claim 4 wherein:
said food support grate comprises a plurality of food support ribs having upper surfaces and bottom portions;
said food support surface comprises said upper surfaces of said food support ribs;
said bottom portions of food support ribs are positioned in said valleys of said upper emitting surface when said food support grate is positioned on said emitter plate; and,
when said food support grate is positioned on said emitter plate, flow channels for fat and water falling onto said upper emitting surface from said food are defined in said valleys of said upper emitting surface beneath said bottom portions of said food support ribs.

6. The module of claim 4 wherein, at a highest heat setting of said module when connected to a standard US 120 volt, 1800 watt electrical outlet, an average heat flux for a total cooking area at said food support surface of at least 7.5 kW/m² is produced.

7. The module of claim 1 wherein each of said longitudinal ends of each of said longitudinal ridges and valleys of said upper emitting surface extends beyond said outer perimeter of said upper end of said module housing.

8. The module of claim 1 further comprising at least one layer of insulating material in said bottom gap and in said upwardly extending annular gap.

9. The module of claim 1 wherein at least one reflective radiation barrier surface is provided in said heating cavity beneath said heating element.

10. The module of claim 1 wherein:
a lateral cross-sectional shape of a bottom surface of said emitter plate comprises downwardly projecting corrugations which correspond to said alternating series of parallel, longitudinal ridges and valleys of said upper emitting surface of said emitter plate and
said upper end of said housing outer side wall has corrugations formed therein in which said downwardly projecting corrugations of said bottom surface of said emitter plate are received.

11. The module of claim 10 wherein said upper end of said heating cavity side wall has corrugations formed therein in which said downwardly projecting corrugations of said bottom surface of said emitter plate are received.

12. The module of claim 11 wherein:
said module further comprises a layer of insulating material in said upwardly extending annular gap and
an upper end of said layer of insulating material in said upwardly extending annular gap has corrugations formed therein in which said downwardly projecting corrugations of said bottom surface of said emitter plate are received.

13. The module of claim 10 wherein said outer perimeter of said upper end of said module housing and said outer perimeter of said emitter plate are each circular, each rectangular, or each oval and said emitter plate is removably positioned on said upper end of said module housing.

14. An apparatus for grilling a food product comprising:
a grill base housing having an interior cavity with an interior bottom;
a lid for opening and closing said grill base housing;
a heating module for radiating heat energy, said heating module being positioned at least partially within said interior cavity of said grill base housing above said interior bottom of said interior cavity, said heating module comprising an emitter plate having an upper emitting surface; and
a food support grate which is positionable on said emitter plate, said food support grate having a food support surface which is spaced above said upper emitting surface of said emitter plate, wherein
said heating module further comprises a module housing having a module heating cavity therein, said module housing having a module housing bottom wall and an upwardly extending module housing side wall, said module heating cavity having a module heating cavity bottom wall and an upwardly extending module heating cavity side wall, said module heating cavity bottom wall being positioned above said module housing bottom wall to form a module bottom gap between said module heating cavity bottom wall and said module housing bottom wall, said module heating cavity side wall laterally surrounds said module heating cavity, said module housing side wall laterally surrounds and is spaced apart from said module heating cavity side wall to form an upwardly extending module annular gap between said module housing side wall and said module heating cavity side wall, said upwardly extending module annular gap laterally surrounds said module heating cavity, an upper end of said module heating cavity side wall defines an outer perimeter of an upper end of said module heating cavity, and an upper end of said module housing side wall defines an outer perimeter of an upper end of said module housing, said module housing bottom wall and said module heating cavity bottom wall have no openings therethrough, said module housing bottom wall is spaced above said interior bottom of said grill base housing, said emitter plate being positioned on said upper end of said module housing and said upper emitting surface of said emitter plate comprising an alternating series of parallel, longitudinal ridges and valleys, said emitter plate having an outer perimeter, and said emitter plate having no openings therethrough, said heating module also comprises at least one electric heating element positioned in said module heating cavity beneath said emitter plate, said outer perimeter of said emitter plate is positioned on or extends beyond said outer perimeter of said upper end of said module housing such that said emitter plate covers and closes said upper ends of said module heating cavity and said module housing such that said upper end of said module heating cavity is at least 99% closed to air flow out of or into said upper end of said module heating cavity, said emitter plate and said module housing are closed to flow from said upper emitting surface of said emitter plate into said module heating cavity of fat and water falling onto said upper emitting surface from said food product, and each longitudinal end of each of said longitudinal ridges and valleys of said upper emitting surface of said emitter plate extends at least as far as said outer perimeter of said upper end of said module housing so that fat and water which falls onto said upper emitting surface from said food product is delivered by said longitudinal ridges and valleys to a location in said interior cavity of said grill base housing outside of said module housing.

15. The apparatus of claim 14 further comprising a grease tray on or beneath said interior bottom of said interior cavity of said grill base housing outside of said heating module.

16. The apparatus of claim 14 wherein said module housing is at least 99% closed to air flow into or out of said module heating cavity.

17. The apparatus of claim 14 wherein said upper end of said module heating cavity beneath said emitter plate has an area of A in$^2$ and a total volume of said module heating cavity beneath said emitter plate is not more than (1.5×A) in$^3$.

18. The apparatus of claim 14 wherein:
said food support grate comprises a plurality of food support ribs having upper surfaces and bottom portions;
said food support surface comprises said upper surfaces of said food support ribs;
said bottom portions of said food support ribs are positioned in said valleys of said upper emitting surface when said food support grate is positioned on said emitter plate; and,
when said food support grate is positioned on said emitter plate, flow channels for fat and water falling onto said upper emitting surface from said food product are defined in said valleys of said upper emitting surface beneath said bottom portions of said food support ribs.

19. The apparatus of claim 14 wherein each of said longitudinal ends of each of said longitudinal ridges and valleys of said upper emitting surface extends beyond said outer perimeter of said upper end of said module housing.

20. The apparatus of claim 14 wherein, at a highest heat setting of said heating module when connected to a standard US 120 volt, 1800 watt electrical outlet, an average heat flux for a total cooking area at said food support surface of at least 7.5 kW/m$^2$ is produced.

21. The apparatus of claim 14 further comprising at least one layer of insulating material in said module bottom gap and in said upwardly extending module annular gap.

22. The apparatus of claim 14 wherein at least one reflective radiation barrier surface is provided in said module heating cavity beneath said electric heating element.

23. The apparatus of claim 14 wherein:
a lateral cross-sectional shape of a bottom surface of said emitter plate comprises downwardly projecting corrugations which correspond to said alternating series of parallel, longitudinal ridges and valleys of said upper emitting surface of said emitter plate and
said upper end of said module housing side wall has corrugations formed therein in which said downwardly projecting corrugations of said bottom surface of said emitter plate are received.

24. The apparatus of claim 23 wherein said upper end of said module heating cavity side wall has corrugations formed therein in which said downwardly projecting corrugations of said bottom surface of said emitter plate are received.

25. The apparatus of claim 24 wherein:
said heating module further comprises a layer of insulating material in said upwardly extending module annular gap and
an upper end of said layer of insulating material in said upwardly extending module annular gap has corrugations formed therein in which said downwardly projecting corrugations of said bottom surface of said emitter plate are received.

26. An outdoor cooking grill for grilling a food product comprising:
a grill base housing having an interior cavity with an interior bottom;
a lid for opening and closing said grill base housing;
a heating module for radiating heat energy, said heating module comprising a module housing at least partially within said interior cavity of said grill base housing, said module housing having a module housing bottom wall above said interior bottom of said interior cavity, said module housing having a module heating cavity therein with a module heating cavity bottom wall which is spaced above said module housing bottom wall, said module housing bottom wall and said module heating cavity bottom wall having no openings therethrough, said module heating cavity having an upwardly extending module heating cavity side wall which laterally surrounds said module heating cavity, and said module housing has an upwardly extending module housing side wall which laterally surrounds and is spaced apart from said module heating cavity side wall to form an upwardly extending module annular gap which laterally surrounds said module heating cavity;
said heating module further comprises an emitter plate positioned on an upper end of said module housing, said emitter plate having an upper emitting surface comprising an alternating series of parallel, longitudinal ridges and valleys and said emitter plate having a bottom surface with a lateral cross-sectional shape comprising downwardly projecting corrugations which correspond to said alternating series of parallel, longitudinal ridges and valleys of said upper emitting surface of said emitter plate;

a food support grate on said upper emitting surface of said emitter plate, said food support grate having a food support surface which is spaced above said upper emitting surface of said emitter plate; and at least one electric heating element positioned in said module heating cavity of said heating module beneath said emitter plate, wherein an upper end of said module housing side wall has corrugations formed therein in which said downwardly projecting corrugations of said bottom surface of said emitter plate are received so that said emitter plate covers and closes an upper end of said module housing and an upper end of said module heating cavity such that said upper end of said module heating cavity is at least 99% closed to air flow out of or into said upper end of said module heating cavity; and said emitter plate and said module housing are closed to flow from said upper emitting surface of said emitter plate into said module heating cavity of fat and water falling onto said upper emitting surface from said food product.

27. The outdoor cooking grill of claim 26 further comprising a grease tray on or beneath said interior bottom of said interior cavity of said grill base housing outside of said heating module.

28. The outdoor cooking grill of claim 26 wherein said module housing is at least 99% closed to air flow into or out of said module heating cavity.

29. The outdoor cooking grill of claim 26, wherein said upper end of said module heating cavity beneath said emitter plate has an area of A in$^2$ and a total volume of said module heating cavity beneath said emitter plate is not more than $(1.5 \times A)$ in$^3$.

30. The outdoor cooking grill of claim 26 wherein:
said food support grate comprises a plurality of food support ribs having upper surfaces and bottom portions;
said food support surface comprises said upper surfaces of said food support ribs;
said bottom portions of food support ribs are positioned in said valleys of said upper emitting surface when said food support grate is positioned on said emitter plate; and,
when said food support grate is positioned on said emitter plate, flow channels for fat and water falling onto said upper emitting surface from said food product are defined in said valleys of said upper emitting surface beneath said bottom portions of said food support ribs.

31. The outdoor cooking grill of claim 26 wherein each end of each of said longitudinal ridges and valleys of said upper emitting surface extends at least as far as an outer perimeter of said upper end of said module housing so that said ridges and valleys will deliver fat and water falling onto said upper emitting surface of said emitter plate from said food product into said interior cavity of said grill base housing outside of said module housing.

32. The outdoor cooking grill of claim 31 wherein each of said ends of each of said longitudinal ridges and valleys of said upper emitting surface extends beyond said outer perimeter of said upper end portion of said module interior housing.

33. The outdoor cooking grill of claim 26 wherein, at a highest heat setting of said outdoor cooking grill when connected to a standard US 120 volt, 1800 watt electrical outlet, an average heat flux for a total cooking area at said food support surface of at least 7.5 kW/m2 is produced.

34. The outdoor cooking grill of claim 26 further comprising at least one layer of insulating material between said module housing bottom wall and said module heating cavity bottom wall and between said upwardly extending module housing side wall and said module heating cavity side wall.

35. The outdoor cooking grill of claim 26 wherein at least one reflective radiation barrier surface is provided in said module heating cavity beneath said electric heating element.

36. The outdoor cooking grill of claim 26 wherein an upper end of said module heating cavity side wall has corrugations formed therein in which said downwardly projecting corrugations of said bottom surface of said emitter plate are received.

37. The outdoor cooking grill of claim 36 wherein:
said heating module further comprises a layer of insulating material between said upwardly extending module housing side wall and said module heating cavity side wall and
an upper end of said layer of insulating material has corrugations formed therein in which said downwardly projecting corrugations of said bottom surface of said emitter plate are received.

38. The outdoor cooking grill of claim 26 wherein said emitter plate is removably positioned on said upper end of said module housing and said food support grate is removably positioned on said upper emitting surface of said emitter plate.

* * * * *